US010516699B2

(12) United States Patent
Yoo et al.

(10) Patent No.: US 10,516,699 B2
(45) Date of Patent: Dec. 24, 2019

(54) ELECTRONIC DEVICE AND METHOD FOR SUGGESTING RESPONSE MANUAL IN OCCURRENCE OF DENIAL

(71) Applicant: Samsung Electronics Co., Ltd., Suwon-si, Gyeonggi-do (KR)

(72) Inventors: Seok-Man Yoo, Suwon-si (KR); Min-Jung Kim, Hwaseong-si (KR); Ki-Yeon Sung, Seoul (KR); Jong-Seung Baek, Suwon-si (KR); Chang-Wook Lee, Hwaseong-si (KR); Su-Yong Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/903,775

(22) PCT Filed: Jul. 14, 2014

(86) PCT No.: PCT/KR2014/006313
§ 371 (c)(1),
(2) Date: Jan. 8, 2016

(87) PCT Pub. No.: WO2015/005744
PCT Pub. Date: Jan. 15, 2015

(65) Prior Publication Data

US 2016/0173532 A1 Jun. 16, 2016

(30) Foreign Application Priority Data

Jul. 12, 2013 (KR) ........................ 10-2013-0082508

(51) Int. Cl.
*H04L 29/06* (2006.01)
*G06F 21/50* (2013.01)
(Continued)

(52) U.S. Cl.
CPC .............. *H04L 63/20* (2013.01); *G06F 21/50* (2013.01); *G06F 21/52* (2013.01); *H04L 63/10* (2013.01);
(Continued)

(58) Field of Classification Search
CPC ..... H04L 63/10; H04L 63/1416; G06F 21/62; G06F 21/554; G06F 17/30082
See application file for complete search history.

(56) References Cited

U.S. PATENT DOCUMENTS 9,219,787 B1 * 12/2015 Manion ................. H04L 67/142
2005/0010820 A1 * 1/2005 Jacobson ................ H04L 29/06 726/4

(Continued)

FOREIGN PATENT DOCUMENTS

CN 103106363 A 5/2013
EP 2 533 168 A1 12/2012

(Continued)

OTHER PUBLICATIONS

"What is SE (Security Enhancements) for Android?" Dec. 29, 2014.

*Primary Examiner* — Mohammad A Siddiqi
(74) *Attorney, Agent, or Firm* — Jefferson IP Law, LLP

(57) ABSTRACT

An electronic device and a method for suggesting a response manual in the occurrence of a denial are provided. The electronic device and the method, according to various embodiments, are capable of: recognizing a policy violation occurring due to an access which does not match a pre-stored security policy; recording, as an access refusal log, information on the policy violation including information of the subject of the access or information of the object of the access, when the access corresponding to the policy violation is not permitted; and notifying a message representing the policy violation via a user interface, in response to the
(Continued)

access refusal log. In addition, other embodiments are available.

9 Claims, 22 Drawing Sheets

(51) Int. Cl.
*G06F 21/52* (2013.01)
*H04W 12/08* (2009.01)

(52) U.S. Cl.
CPC ........... *H04L 63/205* (2013.01); *H04W 12/08* (2013.01); *G06F 2221/2101* (2013.01)

(56) References Cited

U.S. PATENT DOCUMENTS

2007/0294530 A1 12/2007 Zlotnick
2008/0096526 A1* 4/2008 Miettinen ............. G06F 21/552 455/411
2008/0235765 A1 9/2008 Shimizu
2010/0064342 A1* 3/2010 Nakagawa ............ G06F 21/552 726/1
2011/0191817 A1* 8/2011 Oh ........................ G06F 21/608 726/1
2011/0209196 A1* 8/2011 Kennedy ................. G06F 21/55 726/1
2011/0231894 A1* 9/2011 Tovar .................. G06F 21/6218 726/1
2012/0079599 A1 3/2012 Matsune et al.
2012/0089845 A1* 4/2012 Raleigh ................... H04L 12/14 713/176
2012/0095926 A1* 4/2012 Nishimura ........... G06Q 10/103 705/301
2012/0131685 A1 5/2012 Broch et al.
2012/0222120 A1 8/2012 Rim et al.
2012/0255026 A1* 10/2012 Baca ....................... G06F 21/10 726/26
2013/0055387 A1 2/2013 Kim et al.
2013/0276136 A1* 10/2013 Goodwin ................ H04L 67/22 726/27
2013/0310163 A1* 11/2013 Smith ................. G07F 17/3241 463/26
2013/0340089 A1* 12/2013 Steinberg ................ H04L 63/10 726/27
2014/0007222 A1* 1/2014 Qureshi .................. G06F 21/10 726/16
2014/0344936 A1* 11/2014 Thario .................. G06F 21/577 726/25

FOREIGN PATENT DOCUMENTS

KR 10-2012-0096983 A 9/2012
KR 10-2013-0022072 A 3/2013
KR 10-2013-0031035 A 3/2013

* cited by examiner

ELECTRONIC DEVICE AND METHOD FOR SUGGESTING RESPONSE MANUAL IN OCCURRENCE OF DENIAL

BACKGROUND

1. Field of the Disclosure

The present disclosure relate to an electronic device and method for proposing a response manual in occurrence of a denial.

2. Description of the Related

In an electronic device based on SE for Android, in order to overcome a security risk, all processors and applications on a system are classified using domains, an accessible region of each of all the processors and applications is configured, and an execution right thereof is controlled.

SUMMARY

According to embodiments of the present disclosure, a method for operating an electronic device includes: recognizing a policy violation occurring due to an access which does not match a pre-stored security policy; recording, as an access refusal log, information on the policy violation including information of a subject or an object of the access when the access corresponding to the policy violation is not allowed; and notifying of a message indicating the policy violation through a user interface in response to the access refusal log.

According to embodiments of the present disclosure, a method of operating an electronic device includes: recognizing a policy violation generated by an access which does not accord with a pre-stored security policy; notifying of a message indicating the policy violation through a user interface when the access corresponding to the policy violation is not allowed; displaying at least one selection item corresponding to at least one function through the user interface; and performing a function corresponding to a selection item selected by a user from among the at least one selection item.

According to embodiments of the present disclosure, a method of operating an electronic device may include: determining whether an access accords with a first security policy on the basis of the first security policy corresponding to a first domain, to which a subject of the access belongs, from among a plurality of domains; notifying a user of information on the access when the access does not accord with the first security policy; changing a domain corresponding to the subject of the access from the first domain to a second domain on the basis of a response of the user for the notification; and determining whether the access is allowed, by determining whether the access accords with a second security policy corresponding to the second domain.

According to embodiments of the present disclosure, a method of operating an electronic device may include: determining whether an access accords with a first security policy on the basis of the first security corresponding to a first domain, to which a subject of the access belongs, from among a plurality of domains; notifying a user of information on the access when the access does not accord with the first security policy; changing a domain corresponding to the subject of the access from the first domain to a second domain on the basis of a response of the user for the notification; and determining whether the access is allowed, by determining whether the access accords with a second security policy corresponding to the second domain.

According to embodiments of the present disclosure, an electronic device includes: a processor configured to recognize a policy violation generated by an access which does not accord with a pre-stored security policy, and record, as an access refusal log, information on the policy violation including information of a subject or an object of the access when an access corresponding to the policy violation is not allowed; and a display module configured to notify of a message indicating the policy violation through a user interface in response to the access refusal log.

According to embodiments of the present disclosure, an electronic device may include: a processor configured to recognize a policy violation generated by an access which does not accord with a pre-stored security policy, and perform a function corresponding to a selection item selected by a user from among at least one selection item; and a display module configured to notify of a message indicating the policy violation through a user interface when an access corresponding to the policy violation is not allowed, and display at least one selection item corresponding to at least one function through the user interface.

According to embodiments of the present disclosure, an electronic device may include: a user input module configured to receive of selection one security policy from among a plurality of security policies including a first security policy according to a user's input; and a processor module configured to determine whether an access accords with the one security policy on the basis of information of a subject of the access and information of an object of the access, wherein the first security policy is configured to restrain an access to some objects from among a plurality of objects which can be accessed by the electronic device.

According to embodiments of the present disclosure, an electronic device may include: a processor configured to determine whether an access accords with a first security policy on the basis of the first security policy corresponding to a first domain, to which a subject of the access belongs, from among a plurality of domains, change a domain corresponding to the subject of the access from the first domain to a second domain on the basis of a response of the user for the notification, and determine whether the access is allowed, by determining whether the access accords with a second security policy corresponding to the second domain; and a touch screen configured to display information of the access when the access does not accord with the first security policy.

BRIEF DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
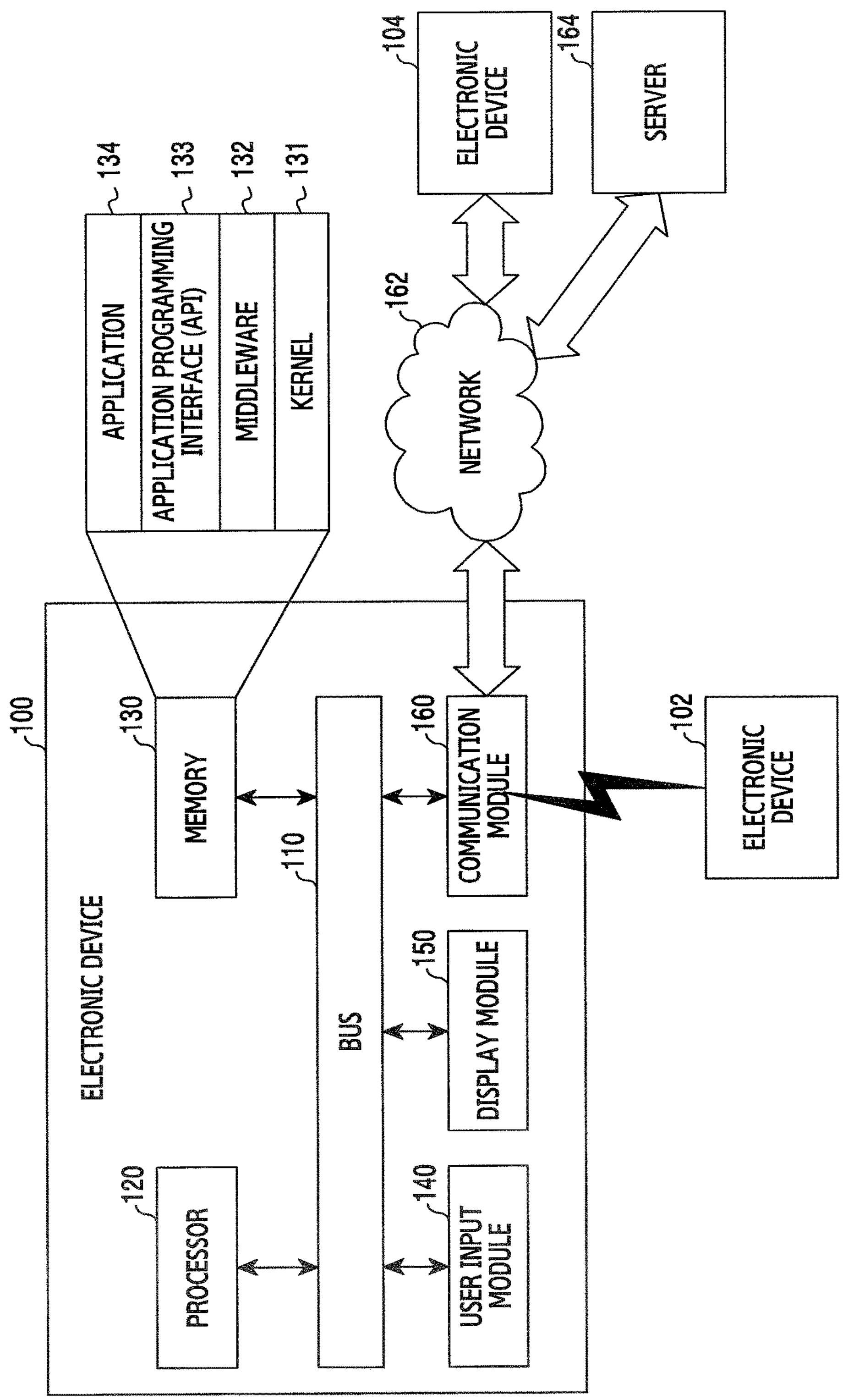
FIG. 1 is a block diagram illustrating an electronic device according to various embodiments of the present disclosure.

Hereinafter, the present disclosure will be described with reference to the accompanying drawings. Although specific embodiments are illustrated in the drawings and related detailed descriptions are discussed in the present disclosure, the present disclosure may have various modifications and several embodiments. Accordingly, the present disclosure is not limited to a specific implementation form and it should be understood that the present disclosure includes all changes or equivalents and substitutes included in the spirit and scope of the present disclosure. In describing the drawings, similar reference numerals are used to designate similar elements.

An electronic device according to the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic appcessory, a camera, a wearable device, an electronic clock, a wrist watch, a home appliance (for example, refrigerator, air conditioner, cleaner, oven, microwave oven, washing machine, and air cleaner), an artificial intelligence robot, a TeleVision (TV), a Digital Video Disk (DVD) player, an audio player, various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a vehicle infotainment device, electronic equipment for a ship (for example, a navigation device for ship, a gyro compass, and the like), avionics, a security device, electronic clothes, an electronic key, a camcorder, game consoles, a Head-Mounted Display (HMD), a flat panel display device, an electronic frame, an electronic album, furniture or a part of buildings/structures having a communication function, an electronic board, an electronic signature receiving device, a wearable device, and a projector. It is obvious to those skilled in the art that the electronic device according to the present disclosure is not limited to the aforementioned devices.

FIG. 1 is a block diagram illustrating an electronic device according to various embodiments. Referring to FIG. 1, the electronic device 100 may include a bus 110, a processor 120, a memory 130, a user input module 140, a display module 150, and a communication module 160.

The bus 110 may be a circuit for connecting the aforementioned components to each other and transmitting communication (e.g., a control message) between the aforementioned components.

The processor 120 can, for example, receive commands from the above-described other components (e.g., the memory 130, the user input module 140, the display module 150, the communication module 160, etc.) through the bus 110, interpret the received commands, and execute calculation or data processing according to the interpreted commands.

The memory 130 can store commands or data received from the processor 120 or other components (e.g., the user input module 140, the display module 150, the communication module 160, etc.) or generated by the processor 120 or the other components. The memory 130 may include programming modules, for example, a kernel 131, middleware 132, an Application Programming Interface (API) 133, and applications 134. Each of the aforementioned programming modules may be formed of software, firmware, hardware, or a combination of at least two thereof.

The kernel 131 can control or manage system resources (for example, the bus 110, the processor 120, the memory 130, or the like.) used to execute operations or functions implemented by other programming modules (for example, the middleware 132, the API 133, and the applications 134). In addition, the kernel 131 can provide an interface through which the middleware 132, the API 133, or the applications 134 may control or manage individual components of the electronic device 100 while accessing the individual components.

The middleware 132 may perform a relay function of allowing the API 133 or the application 134 to communicate with the kernel 131 to exchange data therewith. Further, in connection with operation requests received from the (plurality of) applications 134, the middleware 132 can perform load balancing of the operation requests by using a method of assigning a priority, by which system resources (for example, the bus 110, the processor 120, the memory 130 and the like) of the electronic device 100 can be used, to at least one application among the (plurality of) applications 134.

The API 133 is an interface by which the application 134 can control a function provided by the kernel 131 or the middleware 132 and may include, for example, at least one interface or function for a file control, a window control, image processing, a character control, and the like.

The user input module 140 can, for example, receive input of a command or data from a user, and transfer the received command or data to the processor 120 or the memory 130 through the bus 110. The display module 150 may display a video, an image, data, or the like to the user.

The communication module 160 can connect communication between another electronic device 102 and the electronic device 100. The communication module 160 can support a predetermined short-range communication protocol (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is the same as the electronic device 100 (for example, device of the same type) or another device (for example, device of a different type).

Figure 2:
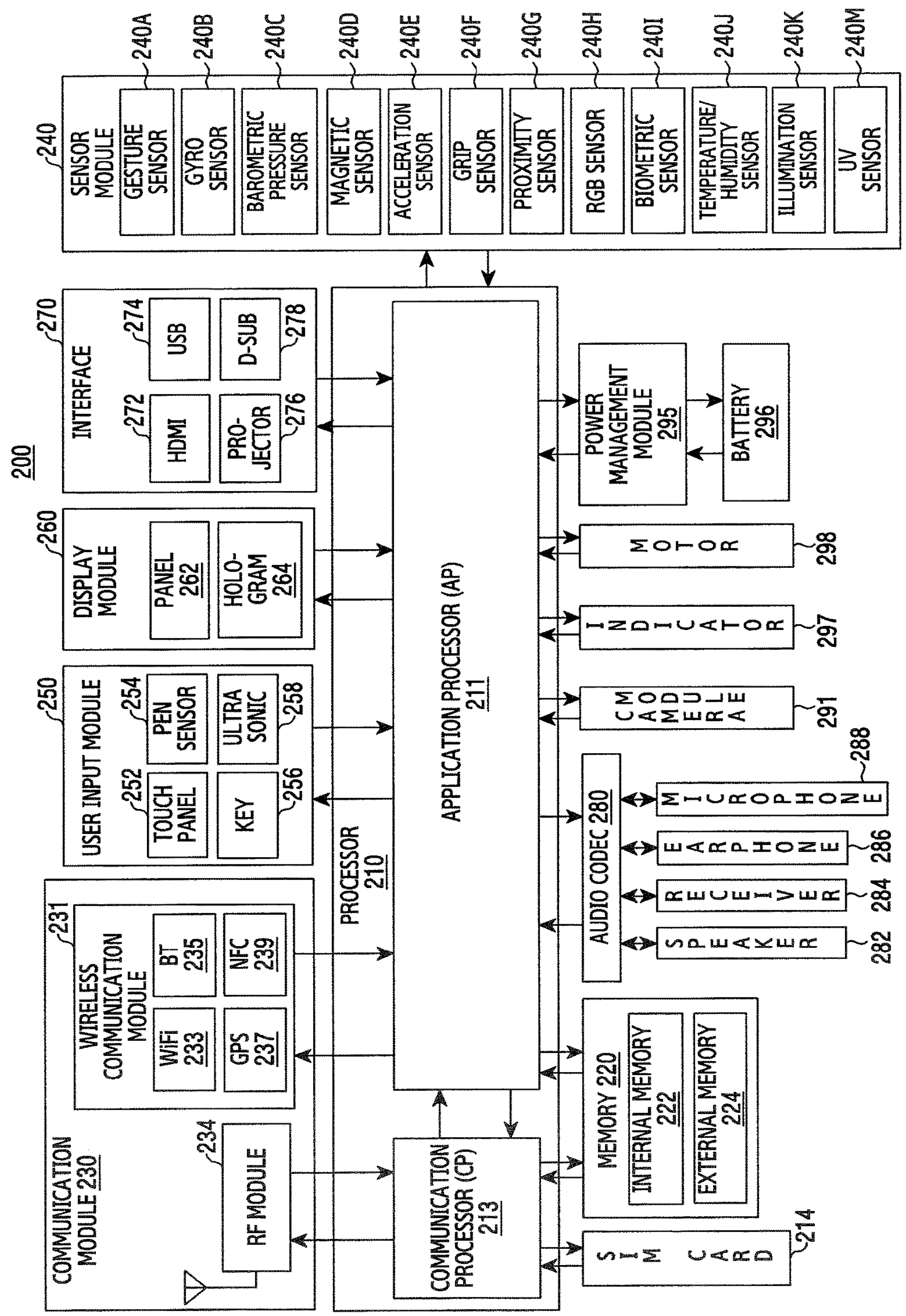
FIG. 2 is a block diagram illustrating hardware according to various embodiments of the present disclosure.

FIG. 2 is a block diagram illustrating hardware 200 according to various embodiments of the present disclosure. The hardware 200 may be, for example, the electronic device 100 illustrated in FIG. 1. Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio CODEC 280, a camera module 291, a power management module 295, a battery 296, an indicator 297, or a motor 298.

The processor 210 (for example, the processor 120) may include one or more Application Processors (APs) 211 or one or more Communication Processors (CPs) 213. The processor 210 may be, for example, the processor 120 illustrated in FIG. 1. Although FIG. 2 illustrates that the AP 211 and the CP 213 are included in the processor 210, the AP 211 and the CP 213 may be included in different IC packages, respectively. In an embodiment, the AP 211 and the CP 213 may be included in one IC package.

In the present disclosure, the processor 210 can monitor whether an access from a specific subject to a specific object accords with a configured security policy, identify that a denial occurs since the access does not accord with the security policy, and analyze contents of the occurred denial. Further, the processor 210 can determine whether at least one log file information from among a first log file and a second log file, which are stored, is changed, and identify the changed log file information when it is determined that the log file information is changed. Further, the processor 210 can determine whether input of a command about whether to transmit the log file information to a server is received, and determine whether data relating to an upload period of the log file information is received from the server.

Further, the processor 210 can identify that the access from the specific subject to the specific object does not accord with the configured security policy. Further, the processor 210 can identify that a first selection region from among at least one displayed selection region is selected, determine whether the access is allowed, by analyzing a downloaded update security policy, and delete a displayed denial message when the access is allowed. Further, the processor 210 can identify that a second selection region from among the at least one displayed selection region is selected, determine whether a name of the specific subject can be extracted, and delete the displayed denial message when receiving an input of a command to delete the specific subject.

Further, the processor 210 can delete the displayed denial message when receiving the command to delete the specific subject from among at least one displayed subject. Further, the processor 210 can identify that a third selection region from among the at least one displayed selection region is selected. Further, the processor 210 can identify that a fourth selection region from among the at least one displayed selection region is selected, determine whether the access is allowed, with reference to a changed security level, and delete the displayed denial message when the access is allowed.

Further, the processor 210 can identify that the specific subject accesses to at least one object from among a plurality of objects, determine whether the object, to which it is identified that the specific subject accesses, is an object included in a list of objects wherein an access thereto is not allowed, and interrupt the access to the object to which it is identified that the specific subject accesses when it is determined that the object is the object included in the list of objects. Further, the processor 210 can allow an access to the object to which the specific subject accesses when the object is not the object included in the list of objects. Further, the processor 210 can identify that a denial occurs due to interruption of the access, and analyze contents of the occurred denial. Further, the processor 210 can identify that a selection region is selected, and identify that a location of the specific subject is moved from a first domain to a second domain.

The AP 211 operates an operation system or an application program so as to control a plurality of hardware or software components connected to the AP 211 and execute various types of data processing and calculations including multimedia data. The AP 211 may be implemented by, for example, a System on Chip (SoC). According to an embodiment, the processor 210 may further include a Graphic Processing Unit (GPU) (not illustrated).

The CP 213 may manage a data line of communication between the electronic device (for example, the electronic device 100) including the hardware 200 and other electronic devices connected through the network and perform a function of converting a communication protocol. The CP 213 may be implemented by, for example, an SoC. According to an embodiment, the CP 213 may perform at least some of multimedia control functions. The CP 213 may distinguish and authenticate an electronic device within a communication network by using a subscriber identification module (for example, the SIM card 214). Further, the CP 213 may provide a user with services, such as a voice call, a video call, a text message, packet data, or the like.

Further, the CP 213 may control data transmission/reception of the communication module 230. In FIG. 2, the components such as the CP 213, the power management module 295, the memory 220, and the like are illustrated as components separate from the AP 211. However, according to an embodiment, the AP 211 may include at least some (e.g., the CP 213) of the above-described components.

According to an embodiment, the AP 211 or the CP 213 may load a command or data received from at least one of a non-volatile memory and other component components connected to each of the AP 211 and the CP 213 to a volatile memory and process the loaded command or data. Further, the AP 211 or the CP 213 may store data received from at least one of other components or generated by at least one of other components in a non-volatile memory.

The SIM card 214 may be a card implementing a subscriber identification module, and may be inserted into a slot formed in a specific portion of the electronic device. The SIM card 214 may include unique identification information (for example, an Integrated Circuit Card IDentifier (ICCID)) or subscriber information (for example, an International Mobile Subscriber IDentity (IMSI)).

The memory 220 may include an internal memory 222 or an external memory 224. The memory 220 may be, for example, the memory 130 illustrated in FIG. 1. The internal memory 222 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). According to an embodiment, the internal memory 222 may be in the form of a Solid State Drive (SSD). The external memory 224 may further include, for example, a Compact Flash (CF), a Secure Digital (SD), a Micro Secure Digital (Micro-SD), a Mini Secure Digital (Mini-SD), an extreme Digital (xD), or a memory stick. The memory 222 according to the present disclosure can store denial information while the denial information is distinguished into one log file type of the first log file and the second log file according to contents of an analyzed denial.

The communication module 230 may include a wireless communication module 231 or a Radio Frequency (RF) module 234. The communication module 230 may be, for example, the communication module 160 illustrated in FIG. 1. The wireless communication module 231 may include, for example, Wi-Fi 233, Bluetooth (BT) 235, a Global Positioning System (GPS) 237, or a Near Field Communication (NFC) 239. For example, the wireless communication module 231 can provide a wireless communication function by using a radio frequency. Additionally or alternatively, the wireless communication module 231 may include a network interface (e.g., a LAN card), a MOdulator/DEModulator (MODEM), or the like for connecting the hardware 200 to a network (e.g., the Internet, a LAN, a WAN, a telecommunication network, a cellular network, a satellite network, a POTS, or the like). The communication module 231 according to the present disclosure can transmit the log file information to the server when receiving input of a command, and periodically upload the log file information to the server in reflection of data about the upload period when receiving the data about the upload period. Further, the communication module 231 can upload the log file information to the server according to a configured period when not receiving the data about the upload period. Further, the communication module 231 can download, from the server, an update security policy of the configured security policy.

The RF module 234 can transmit and receive data, for example, an RF signal or a called electronic signal. Although not illustrated, the RF module 234 may include, for example, a transceiver, a Power Amp Module (PAM), a frequency filter, a Low Noise Amplifier (LNA), or the like. Further, the RF module 234 may further include a component for transmitting/receiving electronic waves over a free air space in wireless communication, for example, a conductor, a conducting wire or the like.

The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a Red-Green-Blue (RGB) sensor 240H, a biometric sensor 240I, a temperature/humidity sensor 240J, an illumination sensor 240K, and an Ultra Violet sensor 240M. The sensor module 240 can measure a physical quantity or sense an operating state of the electronic device, so as to convert the measured or sensed information to an electrical signal. Additionally/alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor, and the like. The sensor module 240 may further include a control circuit for controlling one or more sensors included therein.

The user input module 250 may include a touch panel 252, a (digital) pen sensor 254, a key 256, or an ultrasonic input unit 258. The user input module 250 may be, for example, the user input module 140 illustrated in FIG. 1. The touch panel 252 may recognize a touch input through at least one of, for example, a capacitive type, a resistive type, an infrared type, and an ultrasonic type. Further, the touch panel 252 may further include a controller (not illustrated). In the case of the capacitive type touch panel, proximity recognition as well as a direct touch is possible. The touch panel 252 may further include a tactile layer. In this case, the touch panel 252 may provide a tactile reaction to the user.

The (digital) pen sensor 254 may be implemented, for example, using a method that is the same as or similar to receiving a user's touch input, or using a separate recognition sheet. As the key 256, for example, a keypad or touch key may be used. The ultrasonic input device 258 is a device which can detect an acoustic wave by a microphone (for example, the microphone 288) of the electronic device through a pen generating an ultrasonic signal to identify data and can perform wireless recognition. According to an embodiment, the hardware 200 may receive a user input from an external device (for example, a network, a computer, or a server) connected to the hardware 200 by using the communication module 230.

The user input module 250 can receive an input of a command not to display the displayed denial message during the configured period, and does not display the denial message during the configured period. Further, after identifying that the fourth selection region is selected, the user input module 250 can receive an input of a command to change a current security level to one security level from among configured security levels.

The display module 260 may include a panel 262 or a hologram 264. The display module 260 may be, for example, the display module 150 illustrated in FIG. 1. The panel 262 may be, for example, a Liquid Crystal Display (LCD), an Active-Matrix Organic Light Emitting Diode (AM-OLED), or the like. The panel 262 may be implemented to be, for example, flexible, transparent, or wearable. The panel 262 may be configured as a single module integrated with the touch panel 252. The hologram 264 may show a stereoscopic image in the air by using interference of light. According to an embodiment, the display module 260 may further include a control circuit for controlling the panel 262 or the hologram 264. In the present disclosure, the display module 260 can display a denial message having contents stating that the access is interrupted, when the access does not accord with the security policy.

Further, the display module 260 can display the identified log file information in reflection of the denial message. Further, the display module 260 can display at least one selection region by which the displayed denial message can be deleted, when the denial message having the contents stating that the access is interrupted is simultaneously displayed and selected. Further, the display module 260 can display detailed information of the specific subject when the name of the specific subject can be extracted. Further, the display module 260 can display at least one subject included in a folder in which the specific subject is stored, when the name of the specific subject cannot be extracted. Further, the display module 260 can display a selection region by which a location of the specific subject moves from the first domain in which the specific subject is included to the second domain when being selected.

The interface 270 may include, for example, a High-Definition Multimedia Interface (HDMI) 272, a Universal Serial Bus (UBS) 274, a projector 276, or a D-subminiature (D-sub) 278. Additionally or alternatively, the interface 290 may include, for example, a Secure Digital (SD)/Multi-Media Card (MMC) (not illustrated), or an Infrared Data Association (IrDA) (not illustrated).

The audio CODEC 280 can bidirectionally convert a voice and an electrical signal. The audio CODEC 280 can, for example, convert voice information, which is input to or output through a speaker 282, a receiver 284, an earphone 286, the microphone 288 or the like.

The camera module 291 is a device which can photograph an image and a video. According to an embodiment, the camera module 291 may include one or more image sensors (for example, a front lens or a rear lens), an Image Signal Processor (ISP) (not illustrated) or a flash LED (not illustrated).

The power managing module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an integrated circuit or an SoC semiconductor. Charging methods may be classified into a wired charging method and a wireless charging method. The charger IC may charge a battery and prevent introduction of overvoltage or overcurrent from a charger. According to one embodiment, the charger IC may include a charger IC for at least one of the wired charging method and the wireless charging method. A magnetic resonance scheme, a magnetic induction scheme, or an electromagnetic wave scheme may be exemplified as the wireless charging method, and an additional circuit for wireless charging, such as a coil loop, a resonance circuit, a rectifier, and the like may be added.

The battery gauge can measure, for example, a residual amount of the battery 296, or a voltage, a current, or a temperature during charging. The battery 296 can generate electricity to supply power and may be, for example, a rechargeable battery.

The indicator 297 can indicate particular states of the hardware 200 or a part (e.g., the AP 211) of the hardware 200, for example, a booting state, a message state, a charging state and the like. The motor 298 can convert an electrical signal to a mechanical vibration. An MCU 299 may control the sensor module 240.

Although not illustrated, the hardware 200 may include a processing unit (for example, GPU) for supporting a mobile TV. The processing device for supporting mobile TV can, for example, process media data according to a standard of Digital Multimedia Broadcasting (DMB), Digital Video Broadcasting (DVB), media flow or the like.

The names of the above described components of hardware according to the present disclosure may vary depending on the type of electronic device. The hardware 200 according to an embodiment of the present disclosure may include at least one of the above-described elements. Some of the above-described elements may be omitted from the hardware 200, or the hardware 200 may further include additional elements. In addition, some elements of the hardware according to the present disclosure may be combined with each other to form a single entity so as to equivalently execute functions that the corresponding elements have executed before the combination thereof.

Figure 3:
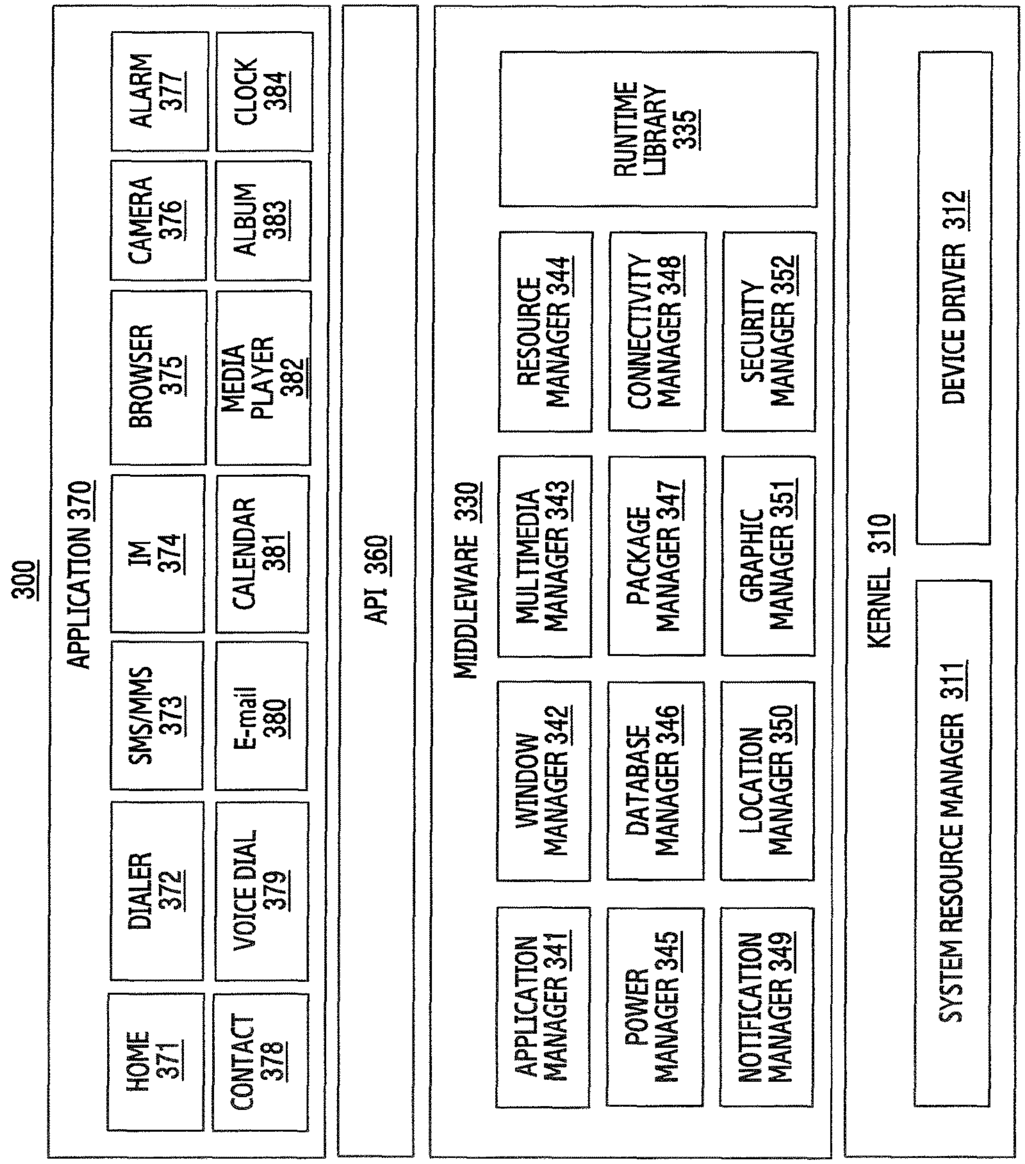
FIG. 3 is a block diagram illustrating a programming module according to an embodiment of the present disclosure.

FIG. 3 is a block diagram illustrating a programming module 300 according to an embodiment. The programming module 300 may be included (e.g., stored) in the electronic device 100 (e.g., the memory 130) illustrated in FIG. 1. At least a part of the programming module 300 may be configured in software, firmware, hardware, or a combination of two or more thereof. The programming module 300 can be implemented in the hardware (e.g., the hardware 200) and may include an Operating System (OS) for controlling resources related to the electronic device (e.g., the electronic device 100) or various applications (e.g., the application 370) running on the OS. For example, the OS may be Android, iOS, Windows, Symbian, Tizen, Bada, and the like. Referring to FIG. 3, the programming module 300 may include a kernel 310, a middleware 330, an Application Programming Interface (API) 360, or the application 370.

The kernel 310 (e.g., the kernel 131) may include a system resource manager 311 or a device driver 312. The system resource manager 311 may include, for example, a process management unit 313, a memory management unit 315, or a file system management unit 317. The system resource manager 311 may perform the control, allocation or collection of the system resources. The device driver 312 may include, for example, a display driver 314, a camera driver 316, a Bluetooth driver 318, a shared memory driver 320, a USB driver 322, a keypad driver 324, a Wi-Fi driver 326, and an audio driver 328. Further, according to an embodiment, the device driver 312 may include an Inter-Process Communication (IPC) driver (not illustrated).

The middleware 330 may include a plurality of modules prepared in advance to provide a function required in common by the applications 370. Further, the middleware 330 can provide a function through the API 360 to allow the application 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or security manager 352.

The runtime library 335 may include, for example, a library module used by a complier, in order to add a new function by using a programming language during the execution of the application 370. According to an embodiment, the runtime library 335 can execute input and output, management of a memory, a function associated with an arithmetic function or the like.

The application manager 341 may, for example, manage a life cycle of at least one of the applications 370. The window manager 342 may manage GUI resources used on the screen. The multimedia manager 343 may identify a format required for reproducing various media files and perform an encoding or a decoding of a media file by using a codec suitable for the corresponding format. The resource manager 344 may manage resources, such as a source code, a memory, a storage space, or the like of at least one of the applications 370.

The power manager 345 can operate together with a Basic Input/Output System (BIOS) to manage a battery or power and provide power information required for the operation. The database manager 346 can manage generation, search, or change of a database to be used by at least one of the applications 370. The package manager 347 can manage an installation or an update of an application distributed in a form of a package file.

The connectivity manager 348 can manage, for example, a wireless connection such as Wi-Fi or Bluetooth. The notification manager 349 can display or notify of an event such as a received message, an appointment, and a proximity notification to a user without disturbance. The location manager 350 can manage location information of the electronic device. The graphic manager 351 can manage a graphic effect provided to a user or a user interface related to the graphic effect. The security manager 352 can provide all security functions required for system security or user authentication. According to an embodiment, when the electronic device (e.g., the electronic device 100) has a telephone function, the middleware 330 may further include a telephony manager (not illustrated) for managing a voice telephony call function or a video telephony call function of the electronic device.

The middleware 330 may generate and use a new middleware module through a combination of various functions of the above-described internal element modules. The middleware 330 can provide modules specialized according to the type of operating system in order to provide differentiated functions. Further, the middleware 330 may dynamically delete some of the conventional components or add new components. Accordingly, the middleware 320 may exclude some of the components described in the embodiments of the present disclosure, further include other components, or substitute the components with components having a different name and performing a similar function.

The API 360 (for example, API 133) is a set of API programming functions, and may be provided with a different configuration according to an operating system. For example, in the case of Android or iOS, a single API set may be provided for each platform, and in the case of Tizen, two or more API sets may be provided.

The applications 370 (e.g., the applications 134) may include, for example, a preloaded application or a third party application.

At least a part of the programming module 300 may be implemented by instructions stored in a computer-readable storage medium. When the command is executed by one or more processors (for example, the processor 210), the one or more processors may execute a function corresponding to the command. The computer-readable storage medium may be, for example, the memory 260. At least some of the programming module 300 may be implemented (for example, executed) by, for example, the processor 210. At least some of the programming module 300 may include, for example, a module, a program, a routine, sets of instructions, or a process for performing one or more functions.

Names of components of the programming module (for example, programming module 300) according to the present disclosure may vary depending on a type of operating system. Further, the programming module according to the present disclosure may include one or more of the aforementioned components, omit some of the components, or further include other additional components.

Various embodiments of the present disclosure propose an apparatus and method which can propose an effective response manual in occurrence of a denial, thereby improving convenience of a user while not damaging security.

Various embodiments of the present disclosure propose an apparatus and method which can distinguishably store a log file record in occurrence of a denial as a general log file and an enterprise log file, so as to be commercialized by a company as well as a person.

Figure 4:
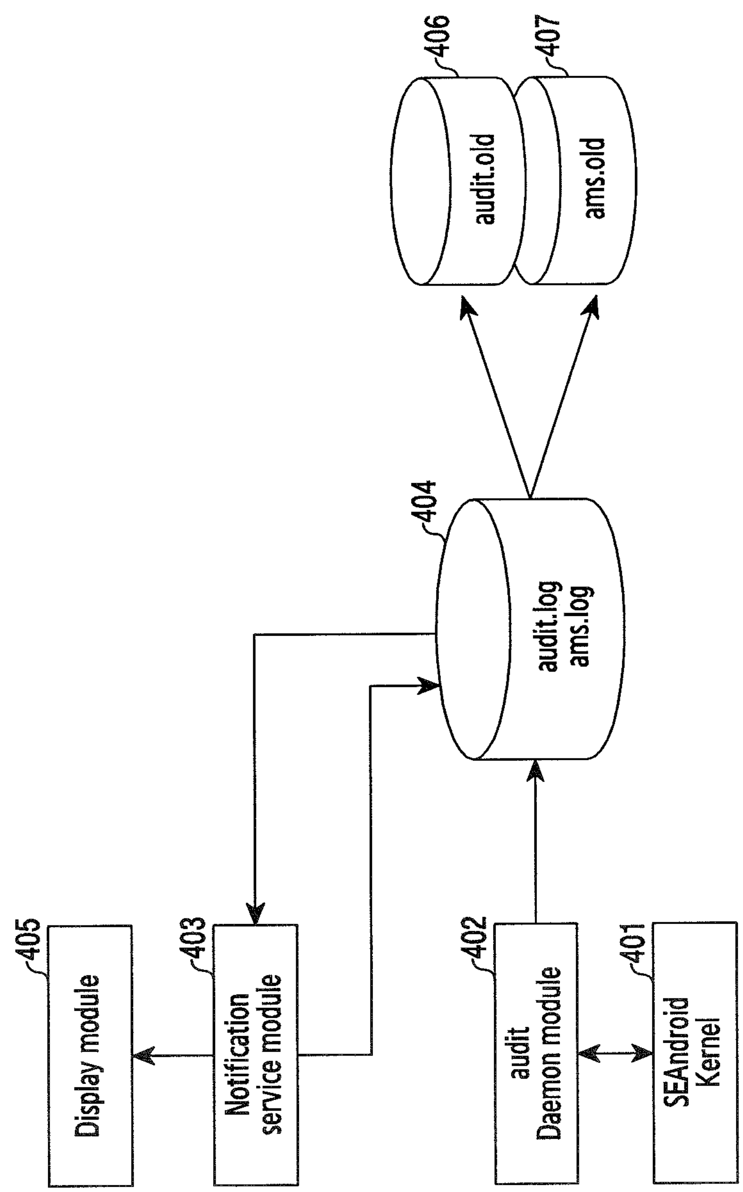
FIG. 4 is a view illustrating a schematic structure of an electronic device according to various embodiments of the present disclosure.

FIG. 4 is a view illustrating a schematic structure of an electronic device according to various embodiments of the present disclosure. Referring to FIG. 4, the electronic device according to the present disclosure may include an SE Android kernel 401, an audit daemon module 402, a notification service module 403, an integrated storage unit 404, a display module 405, a first storage unit 406, and a second storage unit 407. Hereinafter, each component will be described with reference to the present drawing along the operation sequence of the electronic device.

First, the daemon module 402 can monitor whether a denial occurs from the SE Android kernel 401. In more detail, the daemon module 402 can monitor, in real-time, whether an access from a specific subject to a specific object accords with a configured security policy. Here, the denial may occur when the access from the specific subject to the specific object does not accord with the configured security policy. Further, the specific subject may be a plurality of programs (applications) and a plurality of processes, and the specific object may be a plurality of programs and a plurality of processes.

Further, when identifying that the denial occurs from the SE Android kernel 401, the daemon module 402 can store, in the integrated storage unit 404, information on the denial while the information is differentiated into a form of an audit.log and an independent log file form having a predetermined file name. In more detail, the daemon module 402 can store, in the integrated storage unit 404, a history indicating whether an access from a specific subject to a specific object does not accord with a configured policy while the history is differentiated into the form of the audit.log and the separate independent log file form.

Here, the daemon module 402 can store the information on the denial in the integrated storage unit 404 in the form of the audit.log when a general denial occurs, and store the information on the denial in the integrated storage unit 404 in the separate independent log file from when another configured denial occurs. For example, the another configured denial may be a denial occurring when an access to a storage region configured for special use such as enterprise data is attempted. Thus, in the present embodiment, for the convenience, the another configured denial is displayed in a form of an ams.log. However, as long as the meaning is satisfied, the another configured denial is not limited to the form of the ams.log.

The daemon module 402 can monitor whether a denial occurs in the SE Android kernel 401, and the notification service module 403 can periodically monitor whether a changed log file record is stored in the integrated storage unit 404, at the same time. In more detail, the notification service module 403 can identify, in real-time, whether an updated log file record is stored in the integrated storage unit 404 while the log file record is distinguished into the forms of the audit log and the ams log.

For example, when it is determined that the updated log file record is stored as the notification service module 403 periodically monitors whether the changed log file record is stored in the integrated storage unit 404, the notification service module 403 can transmit data for transmitting the denial message to the display module 405.

In the above embodiment, when the log file stored in the integrated storage unit 404 exceeds a configured capacity, the integrated storage unit 404 can store the log file in the first storage unit 406 and the second storage unit 407 while the log file is divided.

For example, an example will be described where, in the integrated storage unit 404, when a data capacity of an audit log file exceeds 32 KB, the audit log file can be stored in the first storage unit 406, and when a data capacity of an ams log file exceeds 20 KB, the ams log file can be stored in the second storage unit 407. In the above example, when it is determined that, in the integrated storage unit 404, the data capacity of the audit log file exceeds 32 KB, the integrated storage unit 404 can divisionally store the stored audit log file in the first storage unit 406. In the same vein, when it is determined that, in the integrated storage unit 404, the data capacity of the ams log file exceeds 20 KB, the integrated storage unit 404 can divisionally store the stored ams log file in the second storage unit 407. Here, the log file can be stored in the electronic device in a compressed and encrypted state.

As described above, since the electronic device can divisionally store the log file in the form of the audit log file and in the form of the ams log file, the log file can be used by an enterprise as well as a personal user.

Figure 5:
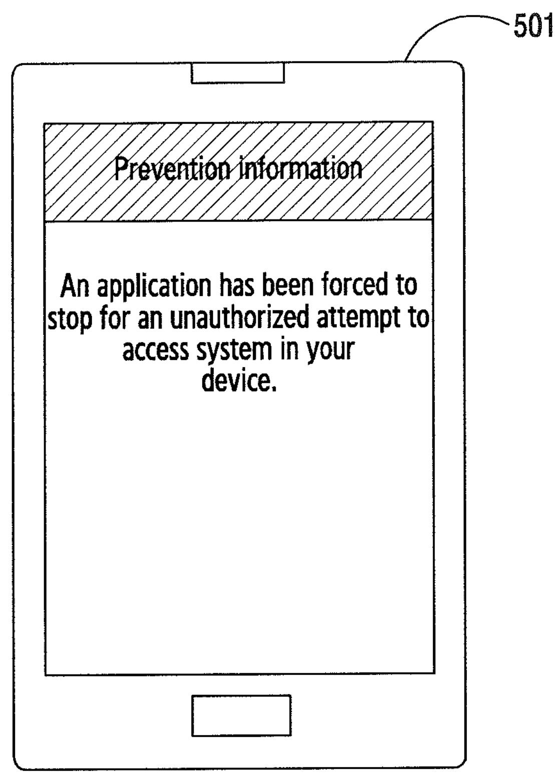
FIG. 5 illustrates various embodiments of a denial message displayed on a touch screen of an electronic device when a denial occurs in an electronic device according to the present disclosure.

FIG. 5 illustrates various embodiments of a denial message displayed on a touch screen of an electronic device when a denial occurs in an electronic device according to the present disclosure. First, the electronic device can monitor whether an access from a specific subject to a specific object accords with a configured security policy, and display a denial message having contents stating that the access is interrupted, when the access does not accord with the configured security policy.

For example, referring to FIG. 5, the electronic device can display, on a touch screen thereof, a denial message stating that "An application has been forced to stop for unauthorized attempt to access system in your device".

Here, when it is determined by the analysis of the electronic device that a name of the subject generating the denial and a name of the object can be specified, the electronic device can display the denial message while the names of the subject and the object are specified in the denial message. For example, an example where the subject generating the denial is a "Z application", and the object is a "network" will be described. In the above example, the electronic device can display the denial message while the name of the subject generating the denial and the name of the object are specified. For example, the denial message may be "An Z application has been forced to stop for unauthorized attempt to access network in your device"

As described above, when the denial occurs, the electronic device according to the present disclosure can display a denial message indicating that the denial occurs to transmit, to a user, a notification message that a security is threated.

Figure 6:
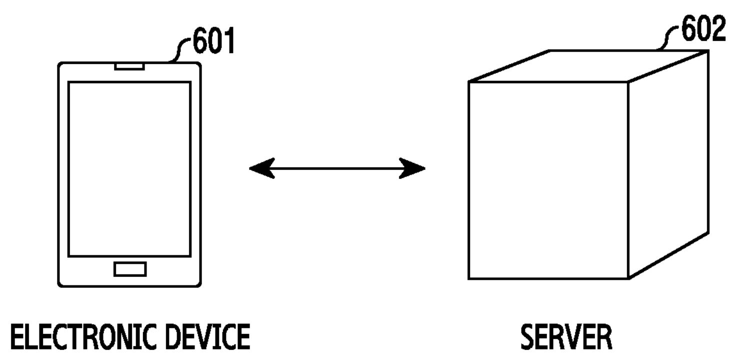
FIG. 6 is a view illustrating various embodiments of uploading a stored log file to a server in an electronic device according to the present disclosure.

FIG. 6 is a view illustrating various embodiments of uploading a stored log file to a server in an electronic device according to the present disclosure. First, when the electronic device 601 identifies that the access from the specific subject to the specific object does not accord with the configured security policy, the electronic device 601 can distinguishably store information on the occurred denial in the log file form in the memory of the electronic device 601. At the same time, the electronic device 601 can display, on the touch screen thereof, the denial message indicating that the denial occurs. As an embodiment, the electronic device can display the denial message while the denial message includes notification contents indicating that the denial occurs and a selection region on which a user selects whether to transmit the stored log file to the server 602. Thereafter, when the electronic device 601 receives an input of a user selection to transmit the stored log file to the server 602, the electronic device 601 can transmit the stored log file to the server 602.

Further, as an embodiment, the electronic device 601 can display, on the touch screen thereof, the denial message indicating that the denial occurs. Thereafter, the electronic device 601 checks whether there is a denial log. When it is determined that an upload period of the denial log has arrived, the electronic device can receive a user input indicating whether to transmit the stored denial log file to the server 602. For example, when it is determined that the denial log is stored in the electronic device 601, the electronic device can display a popup "transmission agreement". Thereafter, when a selection region displayed on the electronic device 601 is selected, the electronic device can upload the log file stored in the memory to the server 602. In more detail, when receiving a user's selection to upload the log file stored in the electronic device to the server 602, the electronic device 601 can upload the stored log file to the server 602.

Further, the electronic device 601 can receive data about a later upload period at which the log file will be uploaded, from the server 602 which has uploaded the log file. For example, when the electronic device 601 receives an agreement from a user to upload the log file to the server 602, the electronic device 601 can receive, from the server 602, data about an upload period which allows following log file to be uploaded at an interval of one week.

However, when the electronic device receives a selection not to identify the denial message during a configured period, if the electronic device has the stored log file and a communication state to transmit the log file to the server 602 is prepared, the electronic device 601 can directly upload the stored log file to the server 602. For example, when the electronic device 601 receives a user's selection of "not to show the denial message for 90 days", if the electronic device 601 has the stored log file, and the current electronic device 601 is in a communication state connected to Wi-Fi, the electronic device 601 can directly upload the stored log file to the server 602.

After transmitting the stored log file according to a configured period, the electronic device can receive, from the server 602, an upload period at which a following log file to be updated later is transmitted, thereby enhancing a security under the control of the server 602.

Figure 7:
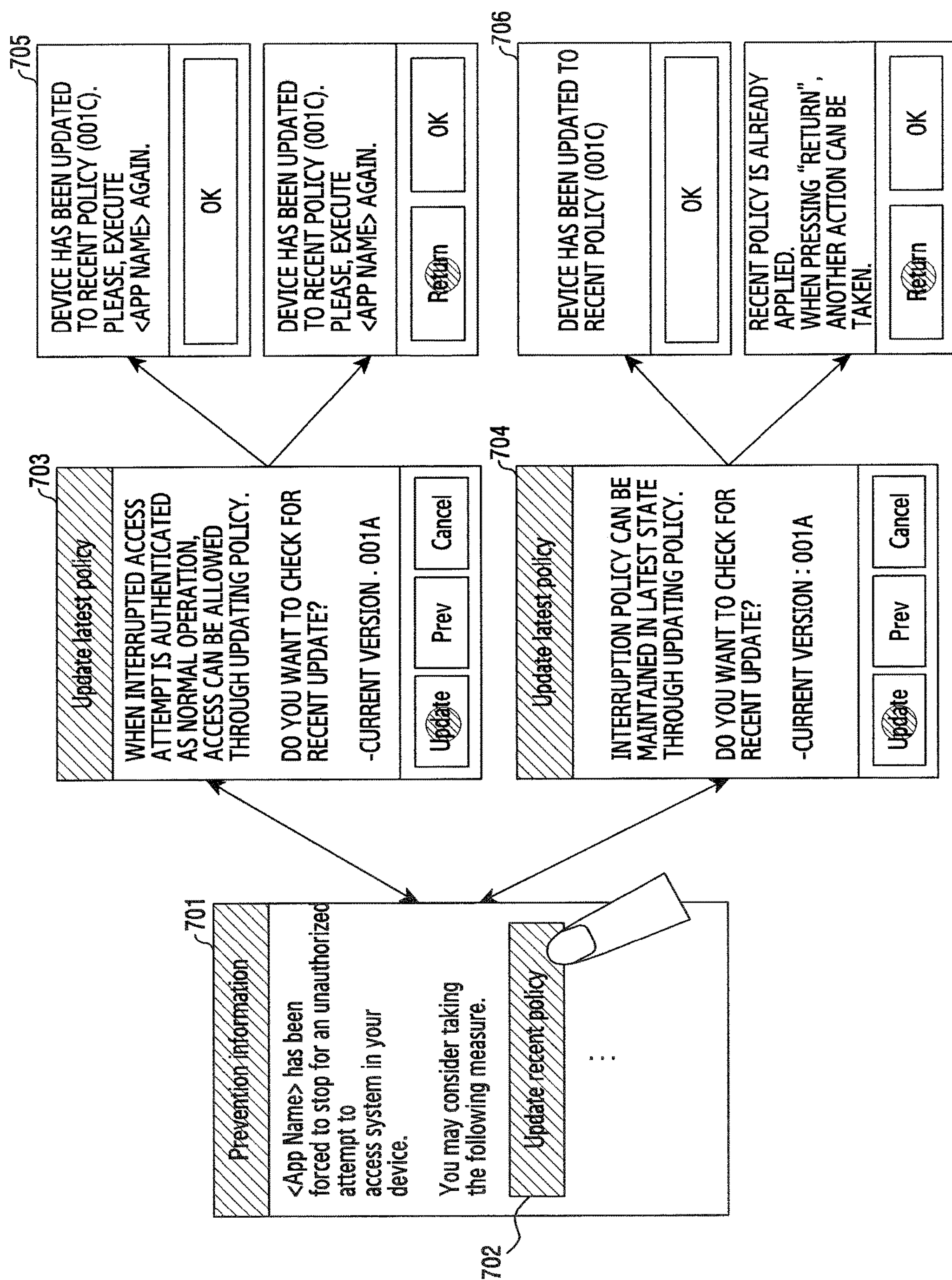
FIG. 7 is a view illustrating an embodiment of proposing a response manual in occurrence of a denial in an electronic device according to the present disclosure.

FIG. 7 is a view illustrating an embodiment of proposing a response manual in occurrence of a denial in an electronic device according to the present disclosure. First, when it is identified that an access from a specific subject to a specific object does not accord with a configured security policy, the electronic device can display, on a touch screen thereof, information indicating that a denial occurs, in a form of a denial message 701. At the same time, the electronic device can display a manual 702 which can response to the occurred denial while the denial message 701 includes the manual 702.

Referring to FIG. 7, the electronic device can display the denial message 701 indicating that the denial occurs. Further, the electronic device can display the manual 702 to receive a user's selection. For example, the electronic device can display the manual 702 such as "Update recent policy", "Identify and remove application", "Remove notification during predetermined period", and "Change security level" as response methods according to the denial.

Further, when one manual 702 from among response manuals according to the denial is selected by a user, the electronic device can response to the occurred denial according to the selected manual 702. For example, referring to FIG. 7, when the electronic device receives selection of the manual 702 "Update recent policy" from a user, the electronic device can display notification messages 703 and 704 according to a currently-configured security level.

For example, when it is configured to enhance a security level in the electronic device, the electronic device can display notification messages 703 and 705 in a sequence illustrated along an upper arrow of FIG. 7. For example, the electronic device can display the notification message 703 stating "When a normal operation is authenticated with regard to an interrupted access attempt, an access can be allowed through updating a policy", and then receive a user's selection to perform the updating, so as to respond to the occurred denial.

For example, when not enhancing a security level is configured in the electronic device, the electronic device can display notification messages 704 and 706 in a sequence illustrated along a lower arrow of FIG. 7. For example, the electronic device can display the notification message 704 "an interruption policy can maintain in a recent state through updating the policy", and then receive the user's selection to perform the updating, so as to respond to the occurred denial.

When the denial occurs, the electronic device according to the present disclosure can propose the response manual 702 "Update recent policy", thereby responding to the occurred denial according to the updated policy.

Figure 8:
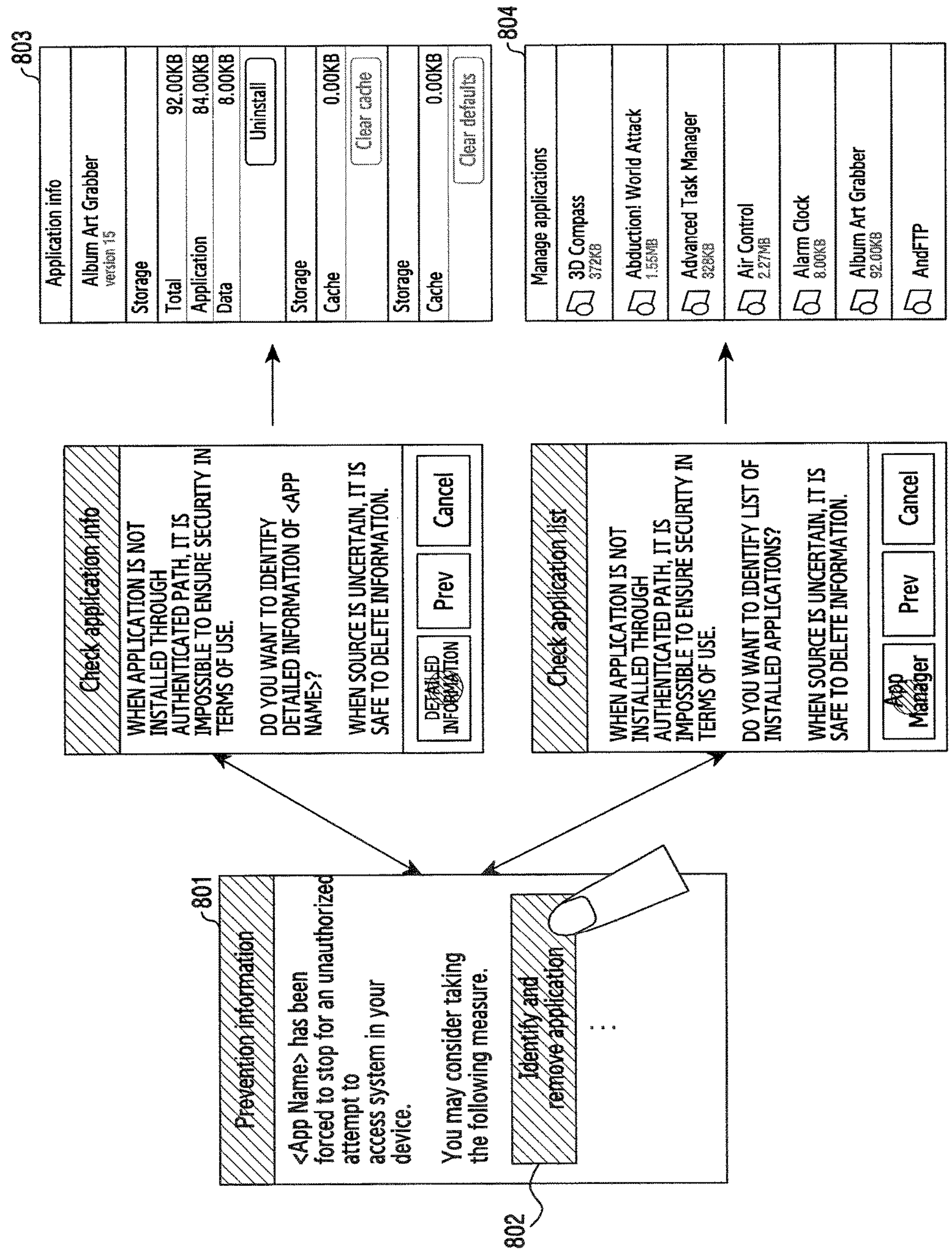
FIG. 8 is a view illustrating an embodiment of proposing a response manual in occurrence of a denial in an electronic device according to the present disclosure.

FIG. 8 is a view illustrating an embodiment of proposing a response manual in occurrence of a denial in an electronic device according to the present disclosure. First, when it is identified that an access from a specific subject to a specific object does not accord with a configured security policy, the electronic device can display, on a touch screen thereof, information indicating that a denial occurs, in a form of a denial message 801. At the same time, the electronic device can display a manual 802 which can respond to the occurred denial while the denial message 801 includes the manual 802.

Referring to FIG. 8, the electronic device can display the denial message 801 indicating that the denial occurs. Further, the electronic device can display the manual 802 to receive a user's selection. For example, the electronic device can display the manual 802 such as "Update recent policy", "Identify and remove application", "Remove notification during predetermined period", and "Change security level" as response methods according to the denial.

Further, when one manual 802 from among response manuals according to the denial is selected by a user, the electronic device can respond to the denial occurring according to the selected manual 802. For example, referring to FIG. 8, when the electronic device receives selection of the manual 802 "Identify and remove application" from a user, the electronic device can display detailed information of an application or display a list in a folder 804 in which the application is stored, and then delete the application selected according to the user's selection.

For example, when the electronic device can specify a name of an application where a denial occurs, the electronic device can receive a user's selection to identify detailed information of the specified application, so as to display detailed information 803 of the application, such as a data use amount, a developer, and a distributor of the selected application. Further, the electronic device can delete the application selected according to the user's selection.

For example, when the electronic device cannot specify the name of the application where the denial occurs, the electronic device can display a list in a folder in which the application is stored, and then delete the application selected according to the user's selection.

When the denial occurs, the electronic device according to the present disclosure can propose the response manual 802 "Identify and delete application" to delete a subject causing the denial to occur, thereby responding to the occurred denial.

Figure 9:
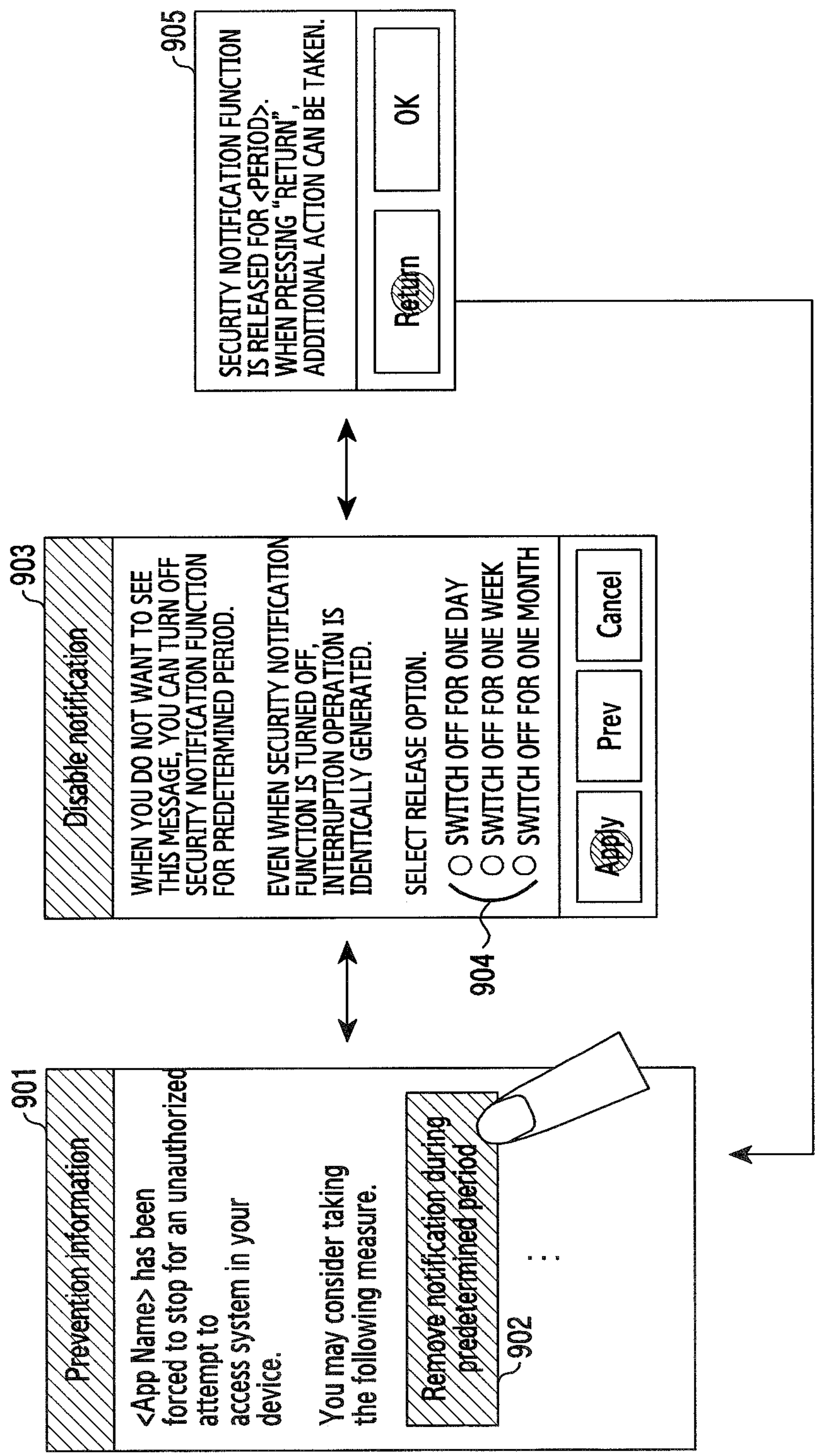
FIG. 9 is a view illustrating an embodiment of proposing a response manual in occurrence of a denial in an electronic device according to the present disclosure.

FIG. 9 is a view illustrating an embodiment of proposing a response manual in occurrence of a denial in an electronic device according to the present disclosure. First, when it is identified that an access from a specific subject to a specific object does not accord with a configured security policy, the electronic device can display, on a touch screen thereof, information indicating that a denial occurs, in a form of a denial message 901. At the same time, the electronic device can display a manual 902 which can respond to the occurred denial while the denial message 901 includes the manual 902.

Referring to FIG. 9, the electronic device can display the denial message 901 indicating that the denial occurs. Further, the electronic device can display the manual 902 to receive a user's selection. For example, the electronic device can display the manual 902 such as "Update recent policy", "Identify and remove application", "Remove notification during predetermined period", and "Change security level" as response methods according to the denial.

Further, when one manual 902 from among response manuals according to the denial is selected by a user, the electronic device can respond to the denial occurring according to the selected manual 902. For example, referring to FIG. 9, when the electronic device receives selection of the manual 902 "Remove notification during predetermined period" from a user, the electronic device can display the manual 902 together with a notification message 903 "when you does not want to see this message, you can turn off a security notification function during a predetermined period" and a manual 904 to select a release option.

For example, when the electronic device receives the manual 904 "Switch off for one month" from among options displayed on the touch screen of the electronic device, the electronic device can sequentially display a guide message 905 stating "the security notification function is switched off for one month. When pressing a return button, an additional action will be performed".

When the denial occurs, the electronic device according to the present disclosure can respond to the occurred denial by proposing the response manual 902 "Remove notification during predetermined period".

Figure 10:
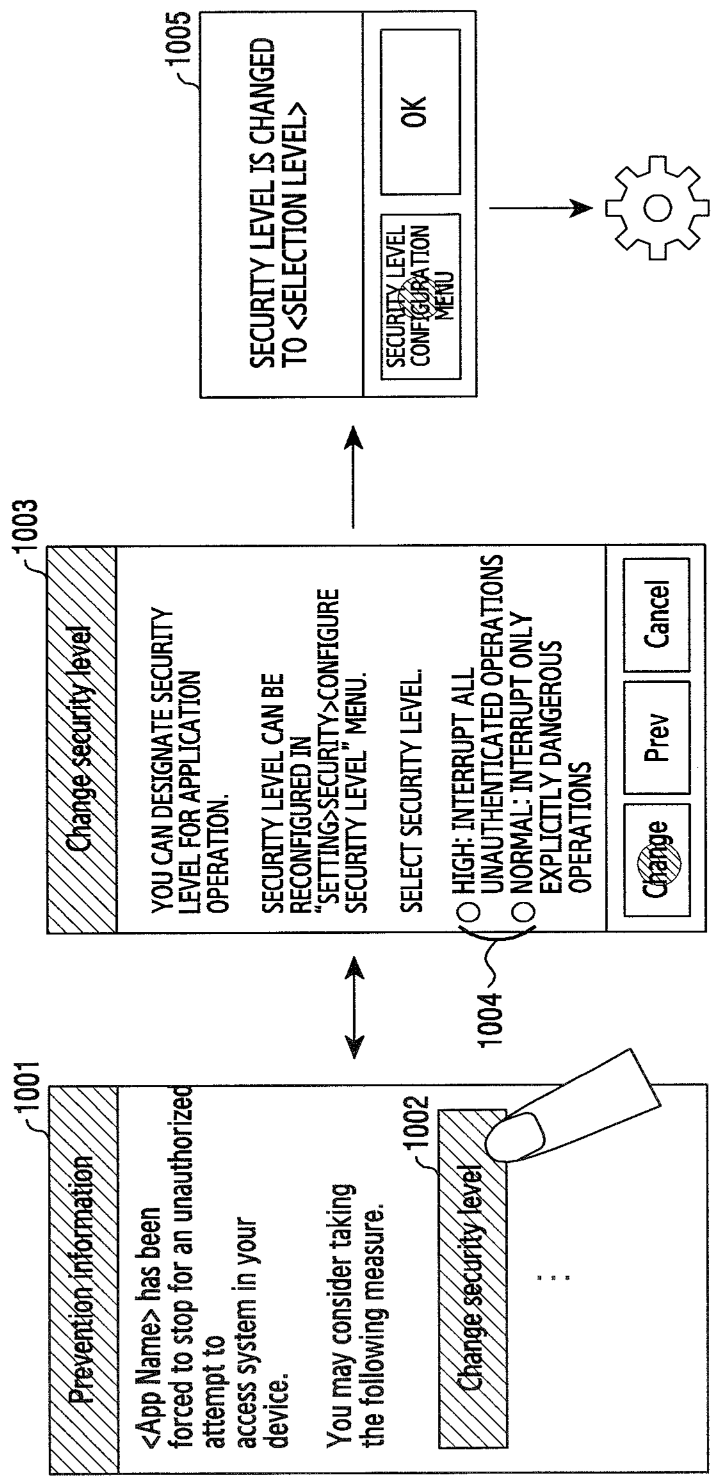
FIG. 10 is a view illustrating an embodiment of proposing a response manual in occurrence of a denial in an electronic device according to the present disclosure.

FIG. 10 is a view illustrating an embodiment of proposing a response manual in occurrence of a denial in an electronic device according to the present disclosure. First, when it is identified that an access from a specific subject to a specific object does not accord with a configured security policy, the electronic device can display, on a touch screen thereof, information indicating that a denial occurs, in a form of a denial message 1001. At the same time, the electronic device can display a manual 1002 which can respond to the occurred denial while the denial message 1001 includes the manual 1002.

Referring to FIG. 10, the electronic device can display the denial message 1001 indicating that the denial occurs. Further, the electronic device can display the manual 1002 to receive a user's selection. For example, the electronic device can display the manual 1002 such as "Update recent policy", "Identify and remove application", "Remove notification during predetermined period", and "Change security level" as response methods according to the denial.

Further, when one manual 1002 from among response manuals according to the denial is selected by a user, the electronic device can respond to the denial occurring according to the selected manual 1002. For example, referring to FIG. 10, when the electronic device receives the manual 1002 "Change security level" from a user, the electronic device can display a notification message 1003 stating "You can designate a security level for an operation of an application. The security level can be reconfigured in a setting-security-security level setting menu" together with a manual 1004 to select a security level option.

For example, when the electronic device receives selection of a security level "high" from among options displayed on a touch screen of the electronic device, the electronic device can sequentially display a guide message 1005 stating "Security level is changed to "high"".

When the denial occurs, the electronic device according to the present disclosure can propose the response manual 1002 "Change security level". Further, the electronic device changes the security level, thereby responding to the occurred denial.

FIG. 11 is a view for describing each security level configured in an electronic device according to various embodiments of the present disclosure. The electronic device according to the present disclosure can differentiate a security level into a first security level and a second security level. In more detail, the first security level from among the security levels may correspond to a level in which all unapproved operations are interrupted, and the second security level may be a level in which only an explicit dangerous operation is interrupted. Hereinafter, each security level will be described in detail through various embodiments illustrated in FIG. 11.

Figure 11B:
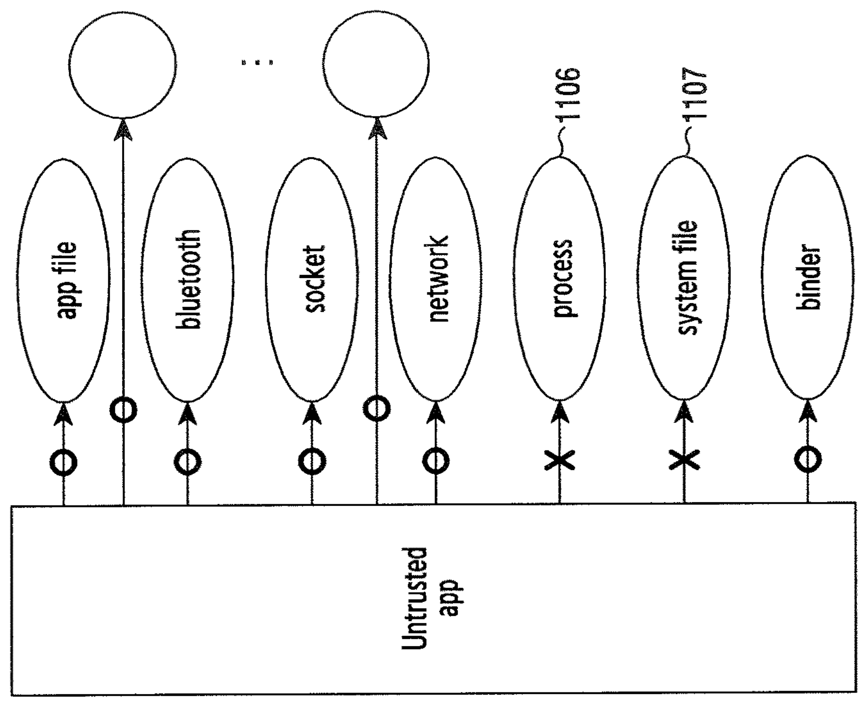
FIG. 11 is a view for describing each security level configured in an electronic device according to various embodiments of the present disclosure.
Figure 11A:
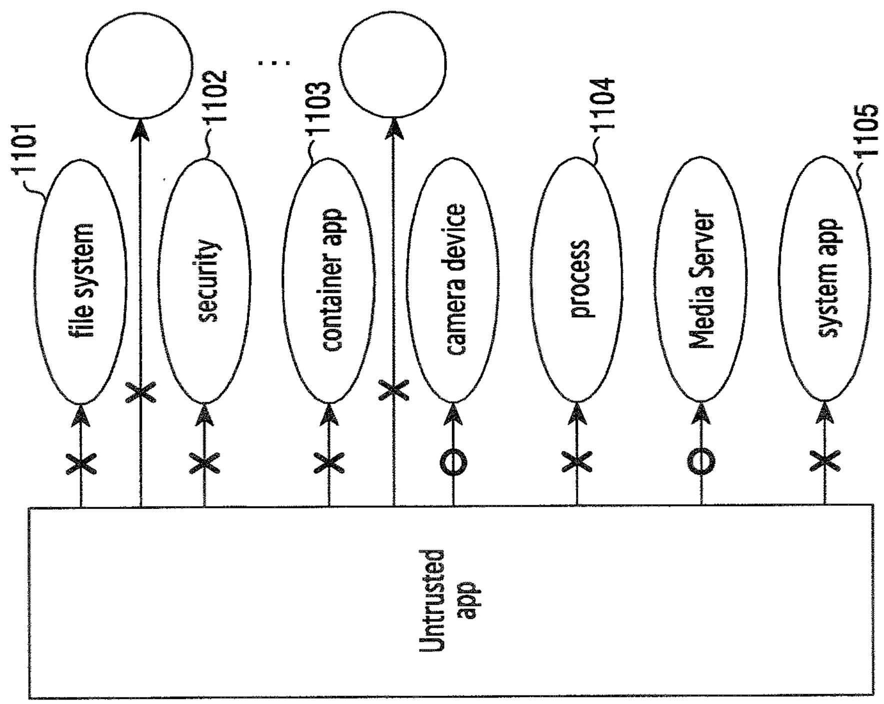

First, referring to FIG. 11A, when the first security level is configured as a security level of the electronic device, the electronic device can interrupt accesses of all unapproved operations. For example, when it is identified in the electronic device that "an untrusted application" corresponding to a specific subject attempts to access specific objects such as "a file system 1101, a security 1102, a container application 1103, a process 1104, and a system application 1105", which are unapproved, the electronic device can simultaneously interrupt the accesses thereto and generate a denial according thereto. For example, the first security level can be a security policy having an enhanced security.

In connection with yet another security level, referring to FIG. 11B, the second security level may be a security policy in which the electronic device interrupts only explicit dangerous operations. For example, when it is identified in the electronic device that an untrusted specific subject accesses a specific object, the object attempting the access can simultaneously interrupt the access for dangerous operations "system file 1106 and process 1107" and generate the denial according thereto. For example, the second security level may be a security policy having a lower level than that of the first security level.

In detail, the electronic device can designate system calls such as setuid, kill or chown, as the second security level, so as to prevent routing of a Linux system, designate the system calls as the second security level not to read or write the security policy itselft, or separately designate a storage region of special security data such as enterprise data as the second security level, so as to prevent an access thereto itself. Further, the electronic device can designate a system file as the second security level, to interrupt, in advance, a phenomenon that an explicit danger may occur, thereby improving security.

As described above, when a denial occurs according to a configured security level, the electronic device can distinguishably store a log file in forms of audit.log and ams.log. Further, as described through FIG. 6, the electronic device can upload the stored log file to the server according to a configured period.

Figure 12:
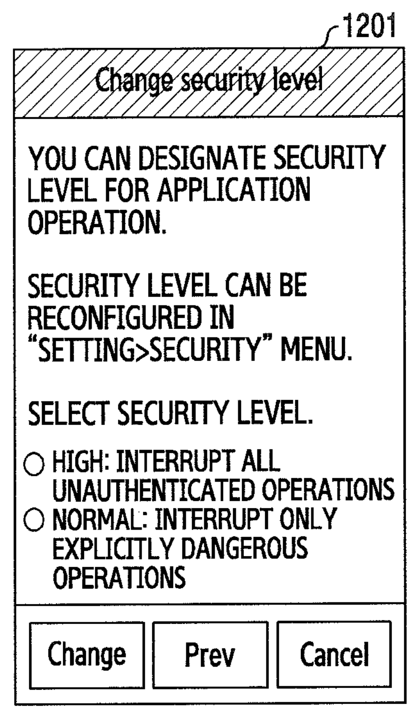
FIG. 12 is a view illustrating various embodiments in which a security level is configured in an electronic device according to the present disclosure.

FIG. 12 is a view illustrating various embodiments in which a security level is configured in an electronic device according to the present disclosure. First, referring to FIG. 12, when the electronic device receives user selection to change a security level, the electronic device can simultaneously display a denial message together with a manual 1201 which can change the security level, on a touch screen of the electronic device. In more detail, even when the denial does not occur in the electronic device, the electronic device can enter the manual 1201 which can change the security level, from a setting menu by user selection.

Further, when the electronic device receives, from a user, selection of one manual from among manuals which can change a security level, the electronic device can change a security level according to the selected manual. For example, referring to FIG. 11, the electronic device can enter the manual which can change the security level in a setting menu by a user's selection, so as to receive selection of the security level.

For example, even before the denial occurs, the electronic device according to the present disclosure can enter the setting menu by the user's selection to change the configured security level, thereby satisfying various desires of a user.

Figure 13A:
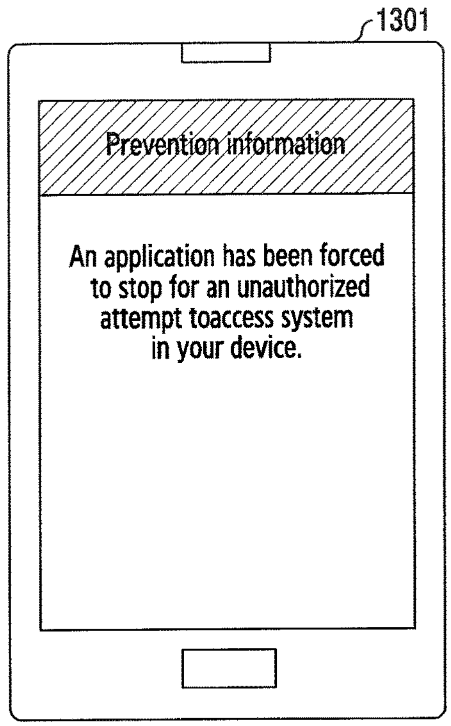
FIG. 13 is a view illustrating various embodiments in which a location of a domain of a specific subject is changed in an electronic device according to the present disclosure.

FIG. 13 is a view illustrating various embodiments in which a location of a domain of a specific subject is changed in an electronic device according to the present disclosure. First, referring to FIG. 13A, the electronic device can monitor whether an access from a specific subject to a specific object accords with a configured security policy, and display a denial message 1301 having contents stating that the access is interrupted, when the access does not accord with the configured security policy.

Further, when it is determined in the electronic device that, in connection with occurrence of the denial, a subject incurring the denial is included in a first domain, the electronic device can receive a user input on whether a domain of the subject incurring the denial moves to a second domain. Here, the first domain may be a domain including only untrusted subjects, and the second domain may be a domain including only trusted subjects.

Figure 13B:
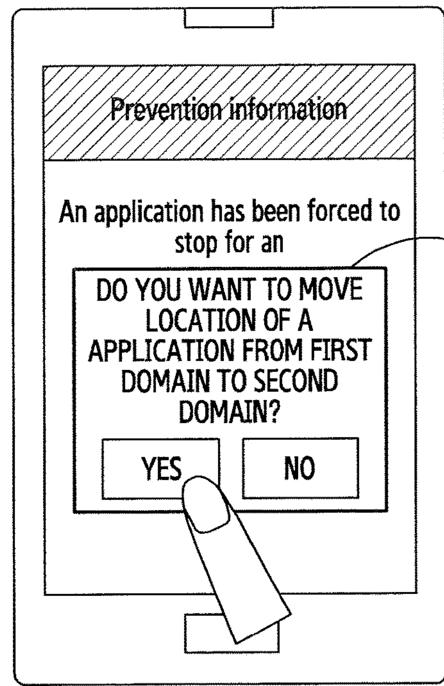
Figure 13C:
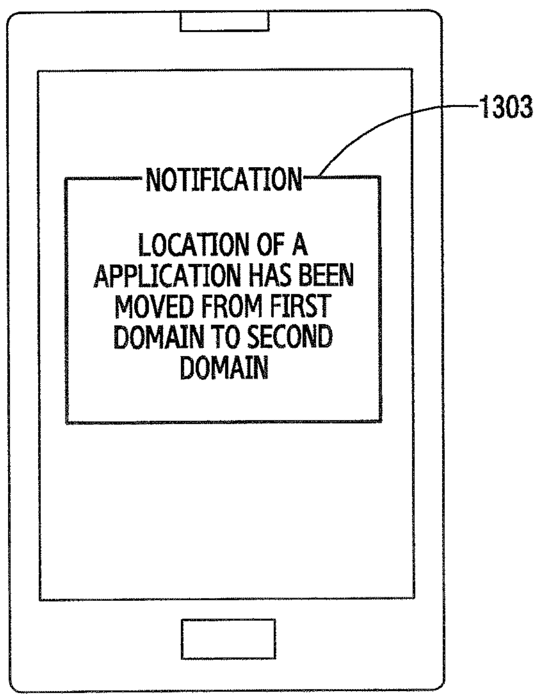

For example, referring to FIG. 13B, a case will be described where, as a result of analyzing a denial occurring in the electronic device, a subject incurring the denial is an “A application”, the “A application” is included in the first domain corresponding to the untrusted subject, and the second domain is a domain including trusted subjects.

In the above example, the electronic device can display a notification message 1302 stating “Move location of A application corresponding to subject incurring denial from first domain to second domain?” together with a selection region which can move the “A application” to the trusted second domain according to a user's selection.

For example, when the electronic device receives a user's input to move the domain, the electronic device can display a guide message 1303 indicating that a location of a subject incurring the denial moves to the trusted domain. For example, referring to FIG. 13C, the electronic device can display a guide message 1303 “Location of A application is moved from first domain to second domain” on a touch screen thereof.

As described above, the electronic device according to the present disclosure can easily move the location of the subject incurring the denial from an untrusted domain to a trusted domain according to user's selection, thereby updating security within the electronic device.

Figure 14:
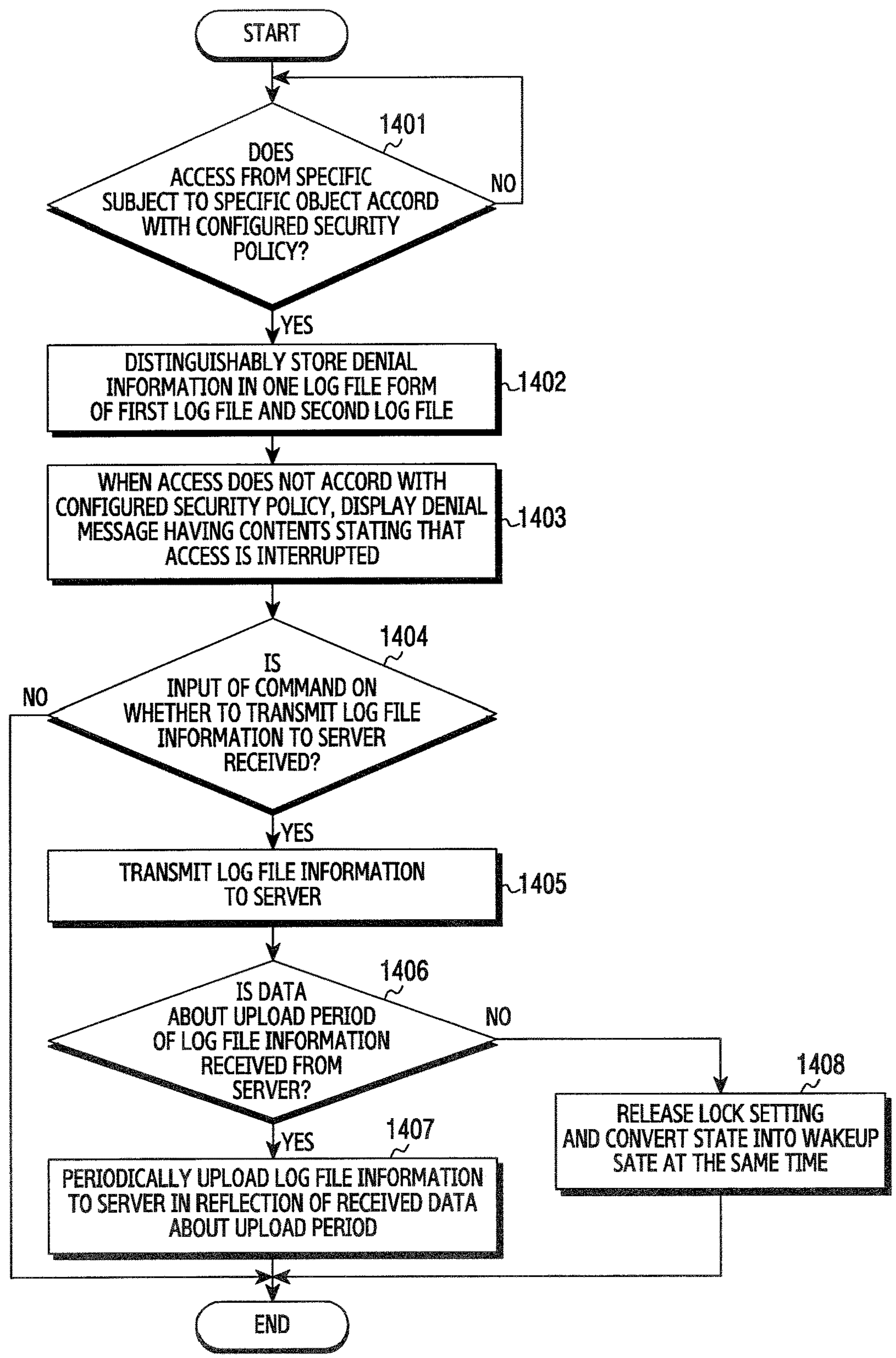
FIG. 14 is a flowchart illustrating an operation sequence of an electronic device, in which a denial message is displayed and a stored log file is uploaded to a server according to various embodiments of the present disclosure.

FIG. 14 is a flowchart illustrating an operation sequence of an electronic device, in which a denial message is displayed and a stored log file is uploaded to a server according to various embodiments of the present disclosure. First, referring to FIG. 14, the electronic device can determine whether an access from a specific subject to a specific object accords with a configured security policy, in operation 1401. Here, the denial may occur when the access from the specific subject to the specific object does not accord with the configured security policy. Further, the specific subject may be a plurality of programs (applications) and a plurality of processes, and the specific object may be a plurality of programs and a plurality of processes.

For example, when it is determined in operation 1401 that the access from the specific subject to the specific object does not accord with the configured security policy, the electronic device can distinguishably store denial information in one log file form of a first log file and a second log file, in operation 1402. Here, when a general denial occurs, the electronic device can store the denial information in a memory in a form of audit.log, and when another configured denial occurs, the electronic device can store the denial information in a form of ams.log. For example, here, the another configured denial may be a denial occurring when an access to a storage region of a special form such as enterprise data is attempted. In the present embodiment, for the convenience, the another configured denial is displayed in a form of an ams.log. However, as long as the meaning is satisfied, the another configured denial is not limited to the form of the ams.log.

Further, when the access does not accord with the security policy, the electronic device can display a denial message having contents stating that the access is interrupted, in operation 1403. The electronic device can display, on a touch screen thereof, a denial message stating “An application has been forced to stop for unauthorized attempt to access system in your device”.

Further, the electronic device can determine whether a command to transmit log file information to a server is received, in operation 1404. In more detail, the electronic device can display the denial message while the denial message includes notification contents indicating that the denial occurs and a selection region on which a user select whether to transmit the stored log file to the server. For example, the electronic device can determine whether a selection region displayed on the touch screen of the electronic device is selected.

For example, when the electronic device receives input of the command to transmit the log file information to the server in operation 1404, the electronic device can transmit the log file information to the server, in operation 1405. In more detail, when receiving a user's selection to transmit the stored log file to the server, the electronic device can upload the stored log file to the server.

Further, the electronic device can determine whether data about an upload period of the log file information is received from the server, in operation 1406. This is because the electronic device can receive, from the server, the data about the upload period of the log file information, but may not receive the data about the upload period from the server according to a restraint of communication.

For example, when receiving the data about the upload period of the log file information in operation 1406, the electronic device can periodically upload the log file information to the server in reflection of the received data about the upload period, in operation 1407. For example, when the electronic device uploads the log file to the server according to the agreement from a user, the electronic device can receive the data about the upload, which allows a following log file to be uploaded at an interval of one week, from the server, and upload the stored log file to the server at a period of one week.

For example, when the electronic device determines that the access from the specific subject to the specific object accords with the configured security policy in operation 1401, the electronic device can repeat operation 1401. Further, when the electronic device does not receive a user input on whether to transmit the log file information to the server in operation 1404, the electronic device can terminate the present sequence.

For example, when the electronic device does not receive, from the server, the data about the upload period of the log file information in operation 1406, the electronic device can upload the log file information to the server according to a configured period, in operation 1408, and then terminate the present sequence.

Figure 15A:
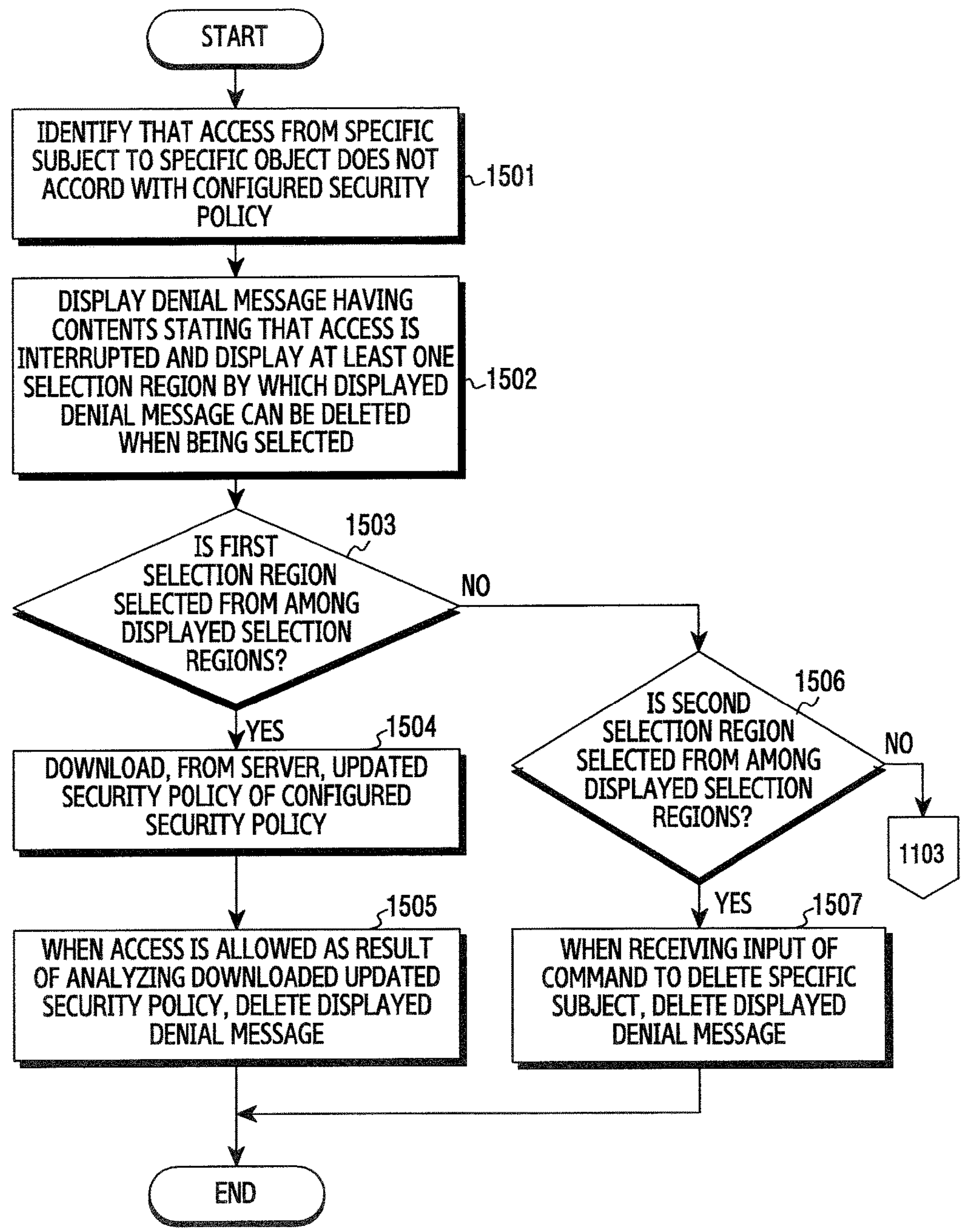
FIG. 15 is a flowchart illustrating an operation sequence of an electronic device, in which a response manual with regard to a generated denial message is proposed according to various embodiments of the present disclosure.
Figure 15B:
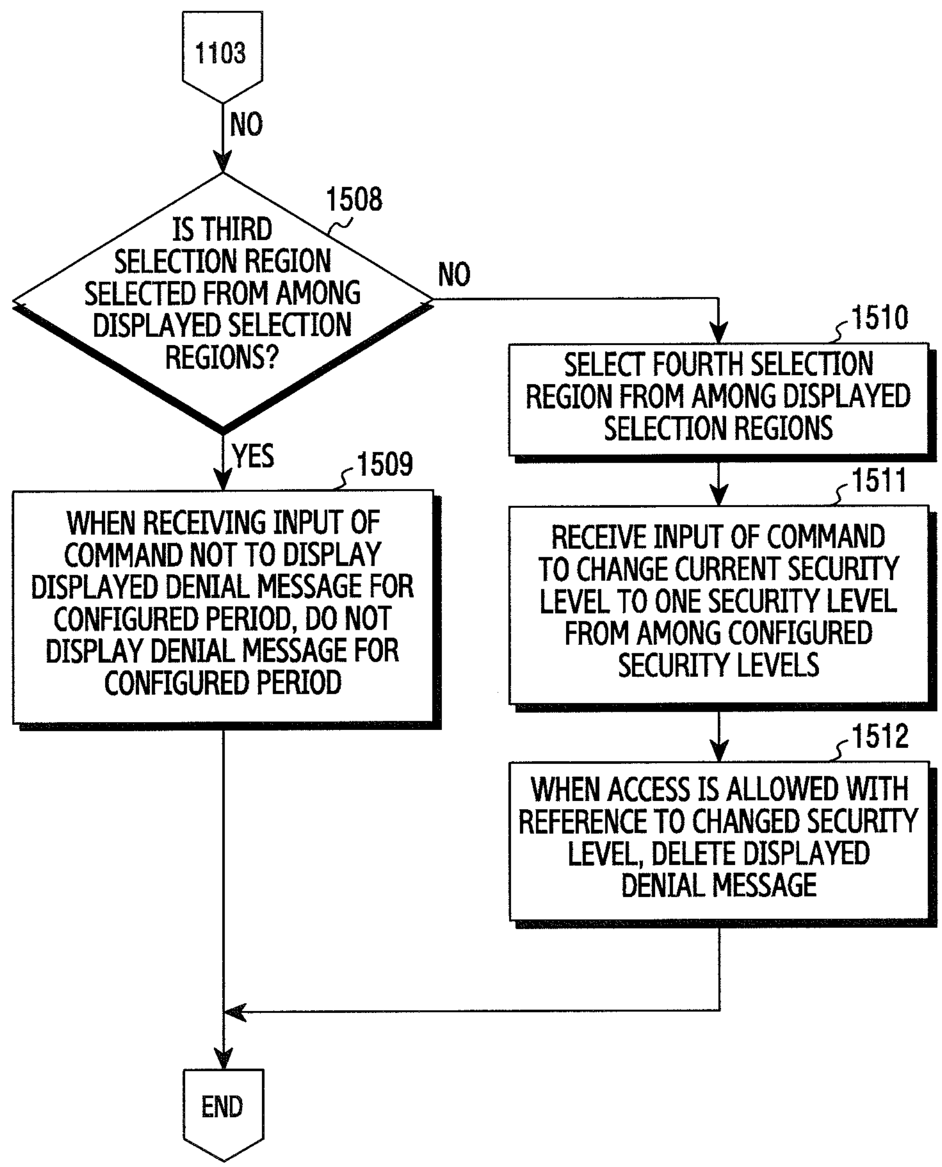

FIG. 15 is a flowchart illustrating an operation sequence of an electronic device, which proposes a response manual with regard to a generated denial message according to various embodiments of the present disclosure. First, referring to FIG. 15, the electronic device can determine whether an access from a specific subject to a specific object does not accord with a configured security policy, in operation 1501. In more detail, the electronic device can identify that the access from the specific subject to the specific object does not accord with the configured security policy, as a result of monitoring whether the access from the specific subject to the specific object accords with the configured security policy.

Further, the electronic device can display at least one selection region by which the displayed denial message can be deleted, while a denial message having the contents stating that the access is interrupted is simultaneously displayed and selected, in operation 1502. In more detail, when it is identified that the access from the specific subject to the specific object does not accord with the configured security policy, the electronic device can display, on a touch screen thereof, information indicating that the denial occurs, in a denial message while the denial message includes a manual which can respond to the occurred denial.

Further, the electronic device can determine whether a first selection region from among displayed selection regions is selected, in operation 1503. For example, the electronic device can display the manual 1 such as "Update recent policy", "Identify and remove application", "Remove notification during predetermined period", and "Change security level" as response methods according to the denial, and then determine whether the first selection region "Update recent policy" is selected.

For example, when it is determined in operation 1503 that the electronic device receives selection of the first selection region from among the displayed selection regions, the electronic device can download, from the server, an update security policy of a configured security policy, in operation 1504. In more detail, the electronic device can download the updated security policy in order to overcome the occurred denial.

Further, when the access is allowed as a result of analyzing the downloaded updated security policy, the electronic device can delete the displayed denial message, in operation 1505. In more detail, with regard to the electronic device, when the access is not allowed in a security policy prior to the updating, but the access is allowed as a result of analyzing the updated security policy, the electronic device can simultaneously delete the displayed denial message and allow the access.

For example, when the electronic device does not receive selection of the first selection region from among the displayed selection regions in operation 1503, the electronic device can determine whether a second selection region is selected, in operation 1506. For example, the electronic device can determine whether a second selection region of "Identify and remove application" is selected from among the manuals such as "Update recent policy", "Identify and remove application", "Remove notification during predetermined period", and "Change security level" as response methods according to the denial.

For example, in a case where the electronic device determines that the second selection region from among the displayed selection regions is selected in operation 1506, if receiving input of a command to delete a specific subject, the electronic device can delete the displayed denial message, in operation 1507. For example, when the electronic device receives selection of the manual "Identify and remove application" from a user, the electronic device can display detailed information of an application or display a list in a folder in which the application is stored, and then delete the application selected according to user's selection.

For example, when the electronic device does not receive selection of the second selection region from among the displayed selection regions in operation 1506, the electronic device can determine whether a third selection region is selected, in operation 1508. For example, the electronic device can determine whether a third selection region of "Remove notification during predetermined period" is selected from among the manuals such as "Update recent policy", "Identify and remove application", "Remove notification during predetermined period", and "Change security level" as response methods according to the denial.

For example, when it is determined in operation 1508 that the electronic device receives selection of the third selection region, if the electronic device receives a command not to display the displayed denial message during a configured period, the electronic device may not display the denial message during the configured period, in operation 1509. For example, when the electronic device receives selection of a manual "Switch off for one month" from among options displayed on the touch screen of the electronic device, the electronic device may not display the denial message even when the denial occurs during the selected one month.

For example, when the electronic device does not receive selection of the third selection region from among the displayed selection regions in operation 1508, the electronic device can determine whether a fourth selection region is selected, in operation 1510. For example, the electronic device can determine whether a fourth selection region of "Change security level" is selected from among the manuals such as "Update recent policy", "Identify and remove application", "Remove notification during predetermined period", and "Change security level" as response methods according to the denial. Here, the electronic device may not receive selection of even one selection region from among the first selection region to the fourth selection region. However, in the present sequence, it is assumed that the fourth selection region is finally selected in order to describe a case where a response manual for the denial is proposed.

Further, the electronic device can receive an input of a command to change a current security level to one security level from among configured security levels, in operation 1511. For example, when the electronic device receives selection of a security level of "high" from among options displayed on a touch screen of the electronic device, the electronic device can display a guide message stating "Security level is changed to "high"".

Further, the electronic device can delete the displayed denial message when the access is allowed with reference to the changed security level, in operation 1512. For example, when the access from the specific subject to the specific object is allowed as a result of changing the security level in the electronic device, the electronic device can delete the displayed denial message.

Figure 16:
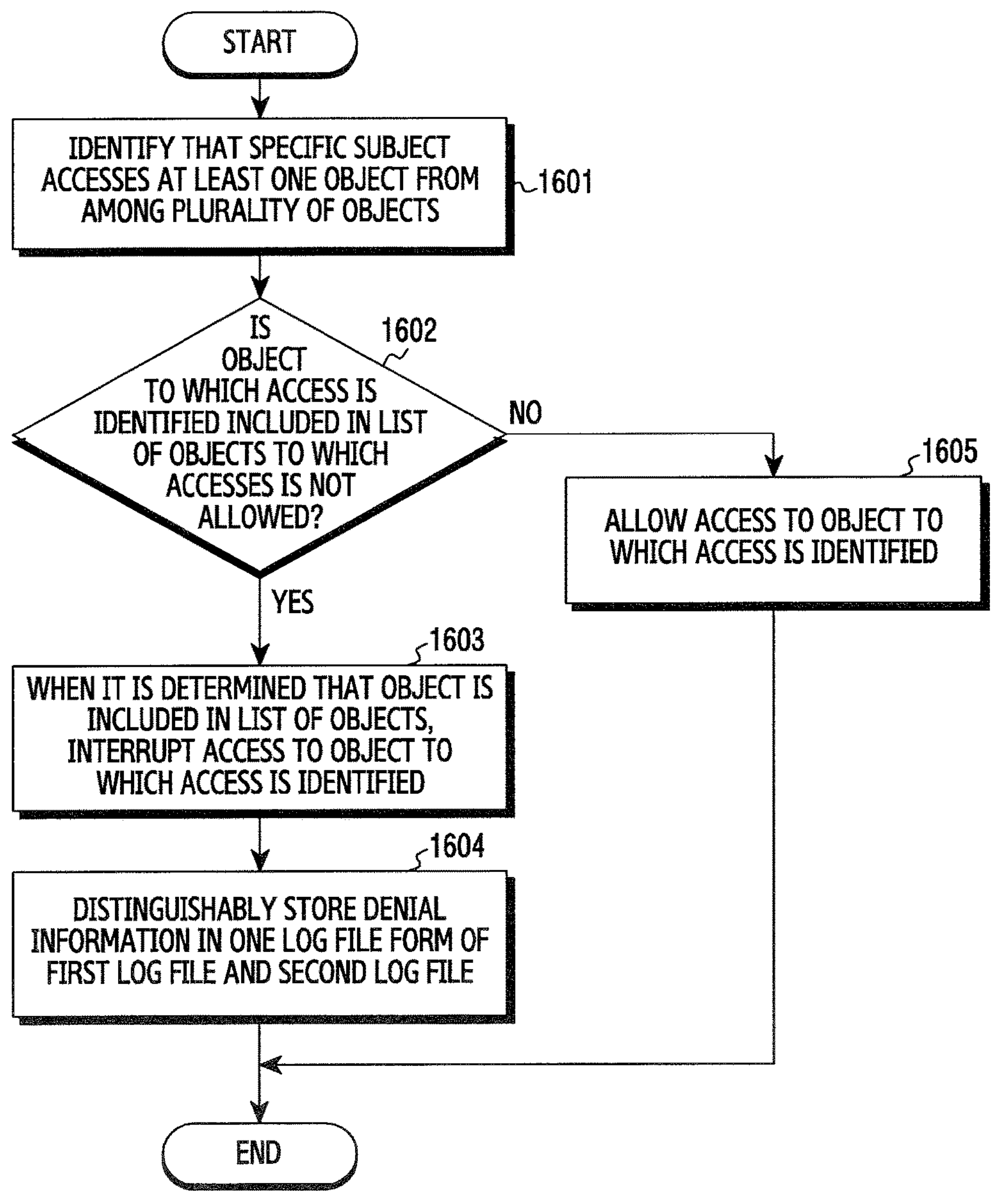
FIG. 16 is a flowchart illustrating an operation sequence of an electronic device, in which whether an access is allowed is determined according to a configured security level according to various embodiments of the present disclosure.

FIG. 16 is a flowchart illustrating an operation sequence of an electronic device, in which whether an access is allowed is determined according to a configured security level according to various embodiments of the present disclosure. First, referring to FIG. 16, the electronic device can identify that a specific subject accesses at least one object from among a plurality of subjects, in operation 1601.

Further, the electronic device can determine whether an object to which the access is identified is included in a list of objects to which access is not allowed, in operation 1602. For example, when the list of objects to which the access is not allowed includes a "system file and process" according to a configured security policy of the electronic device, the electronic device can determine whether an untrusted subject accesses an object of the "system file and process".

For example, when the electronic device determines that the object to which the access is identified is included in the list of objects to which the access is not allowed in operation 1602, the electronic device can interrupt the access to the object to which the access is identified, in operation 1603. In the above example, the electronic device can interrupt an access to an object "system file and process" included in the list of objects.

Further, the electronic device can distinguishably store the denial information in one log file form of a first log file and a second log file, in operation 1604. For example, the electronic device can distinguishably store a record indicating whether the access from the specific subject to the specific object does not accord with the configured policy, in the memory in the forms of audit.log and ams.log.

For example, when the electronic device determines that the object to which the access is identified is not included in the list of objects to which the access is not allowed in operation 1602, the electronic device can allow the access to the object to which the access is identified, in operation 1605.

Figure 17:
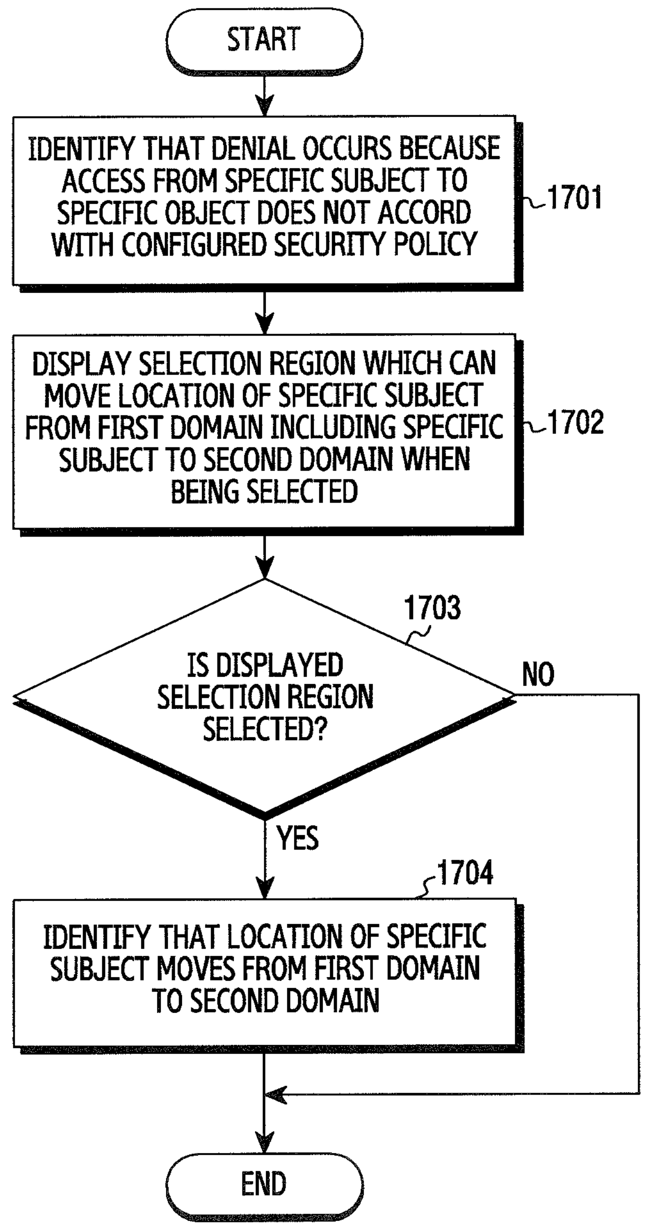
FIG. 17 is a flowchart illustrating an operation sequence of an electronic device, in which a location of a specific subject is changed according to the present disclosure.

FIG. 17 is a flowchart illustrating an operation sequence of an electronic device, in which a location of a specific subject is changed according to the present disclosure. First, referring to FIG. 17, the electronic device can identify that a denial occurs because an access from a specific subject to a specific object does not accord with a configured security policy, in operation 1701.

Further, the electronic device can display a selection region by which a location of the specific subject moves from the first domain in which the specific subject is included to the second domain when receiving selection, in operation 1702. In more detail, when it is determined in the electronic device that, in connection with occurrence of the denial, a subject incurring the denial is included in the first domain, the electronic device can display a selection region in which the electronic device can receive a user's input on whether a domain of the subject incurring the denial moves to a second domain. Here, the first domain may be a domain including only untrusted subjects, and the second domain may be a domain including only trusted subjects.

Further, the electronic device can determine whether the displayed selection region is selected, in operation 1703. For example, the electronic device can determine whether an input of a selection region by which a location of a subject incurring the denial can move to a trusted domain is received.

For example, when it is determined in operation 1703 that the electronic device receives selection of the displayed selection region, the electronic device can identify that the location of the specific subject moves from the first domain to the second domain, in operation 1704. For example, when the electronic device receives user selection to move the location of the domain in which the subject incurring the denial is stored, the electronic device can move the location of the subject incurring the denial from the first domain to the second domain.

Figure 18:
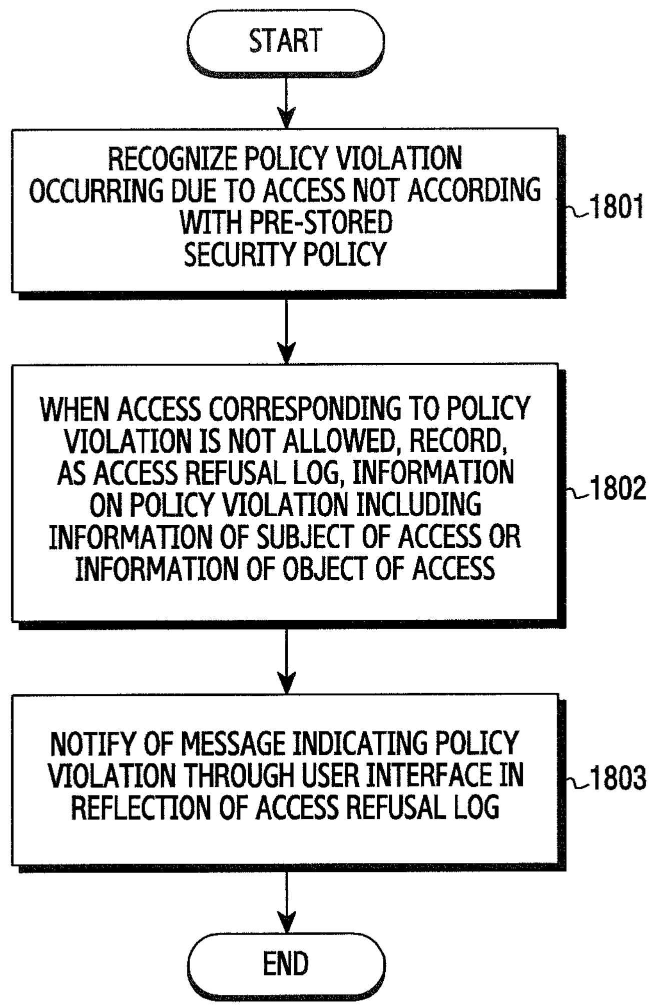
FIG. 18 is a flowchart illustrating a method of an electronic device, in which a denial message is displayed and a stored log file is uploaded to a server according to various embodiments of the present disclosure.

FIG. 18 is a flowchart illustrating a method of an electronic device, in which a denial message is displayed and a stored log file is uploaded to a server according to various embodiments of the present disclosure. First, referring to FIG. 18, the electronic device can recognize policy violation generated by an access not according with a pre-stored security policy, in operation 1801.

Further, when the access corresponding to the policy violation is not allowed, the electronic device can record information on the policy violation including information of a subject or information of an object of the access, as an access refusal log, in operation 1802.

Further, the electronic device can notify of a message indicating the policy violation through a user interface in reflection of the access refusal log, in operation 1803.

Figure 19:
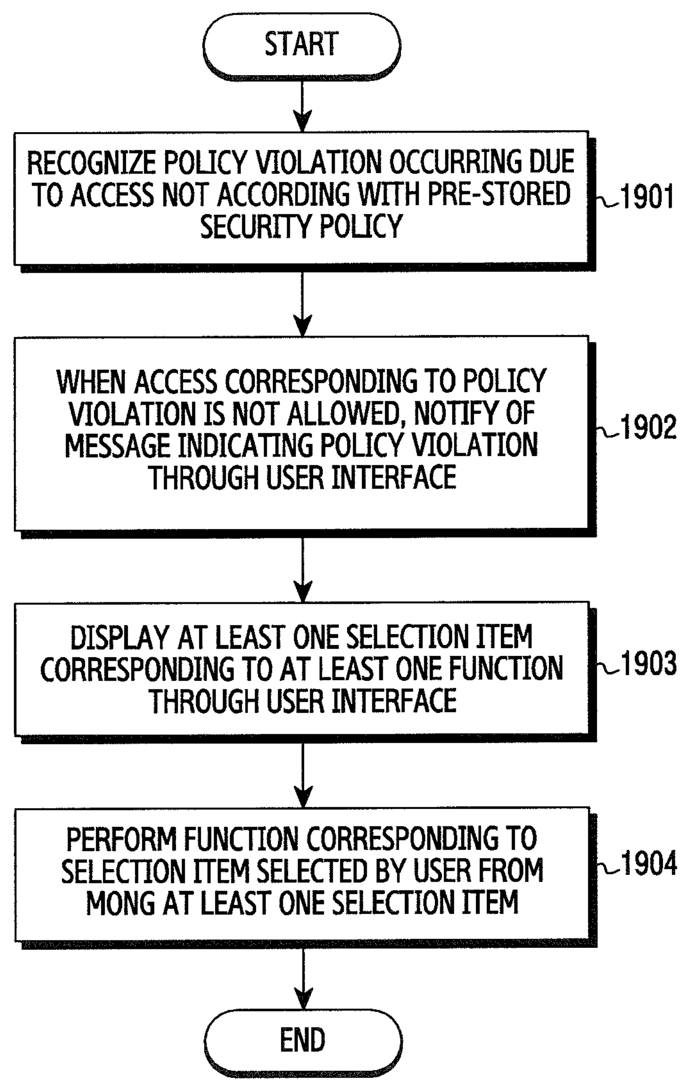
FIG. 19 is a flowchart illustrating a method of an electronic device, in which whether an access is allowed is determined according to a configured security level according to various embodiments of the present disclosure.

FIG. 19 is a flowchart illustrating a method of an electronic device, in which whether an access is allowed is determined according to a configured security level according to various embodiments of the present disclosure. First, referring to FIG. 19, the electronic device can recognize a policy violation generated by an access not according with a pre-stored security policy, in operation 1901.

Further, the electronic device can notify of a message indicating the policy violation through a user interface when an access corresponding to the policy violation is not allowed, in operation 1902.

Further, the electronic device can display at least one selection item corresponding to at least one function through the user interface, in operation 1903.

Further, the electronic device can perform a function corresponding to a selection item selected by a user from among the at least one selection item, in operation 1904.

Figure 20:
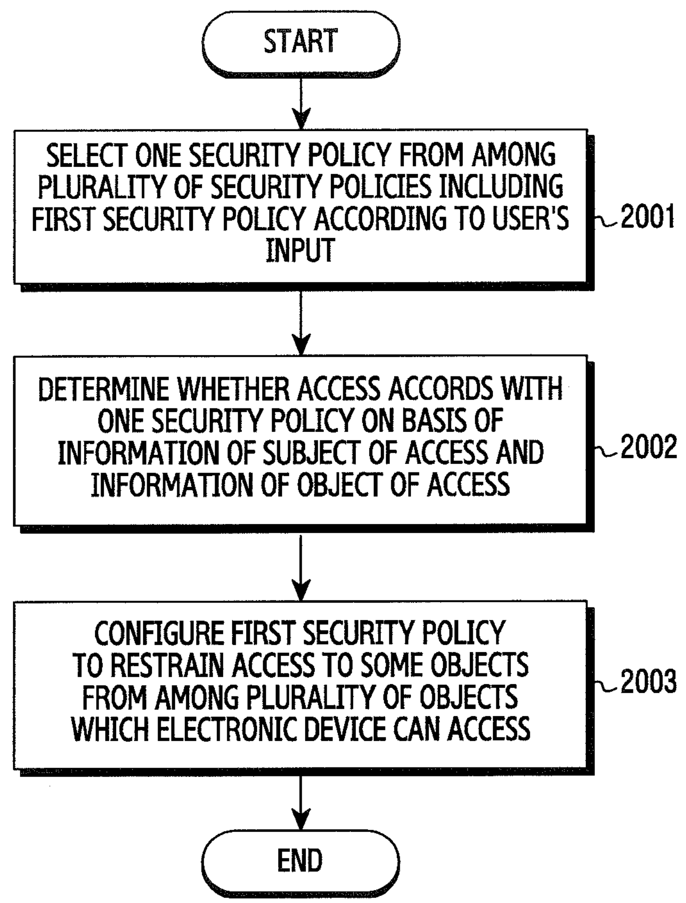
FIG. 20 is a flowchart illustrating a method of an electronic device, in which whether an access is allowed is determined according to a configured security level according to various embodiments of the present disclosure.

FIG. 20 is a flowchart illustrating a method of an electronic device, in which whether an access is allowed is determined according to a configured security level according to various embodiments of the present disclosure. First, referring to FIG. 20, the electronic device can select one security policy from among a plurality of security policies including a first security policy according to a user's input, in operation 2001.

Further, the electronic device can determine whether an access accords with one security policy on the basis of information of a subject of the access and information of an object of the access, in operation 2002.

Further, in the electronic device, the first security policy can be configured to limit an access with respect to some objects from among a plurality of objects, in operation 2003.

Figure 21:
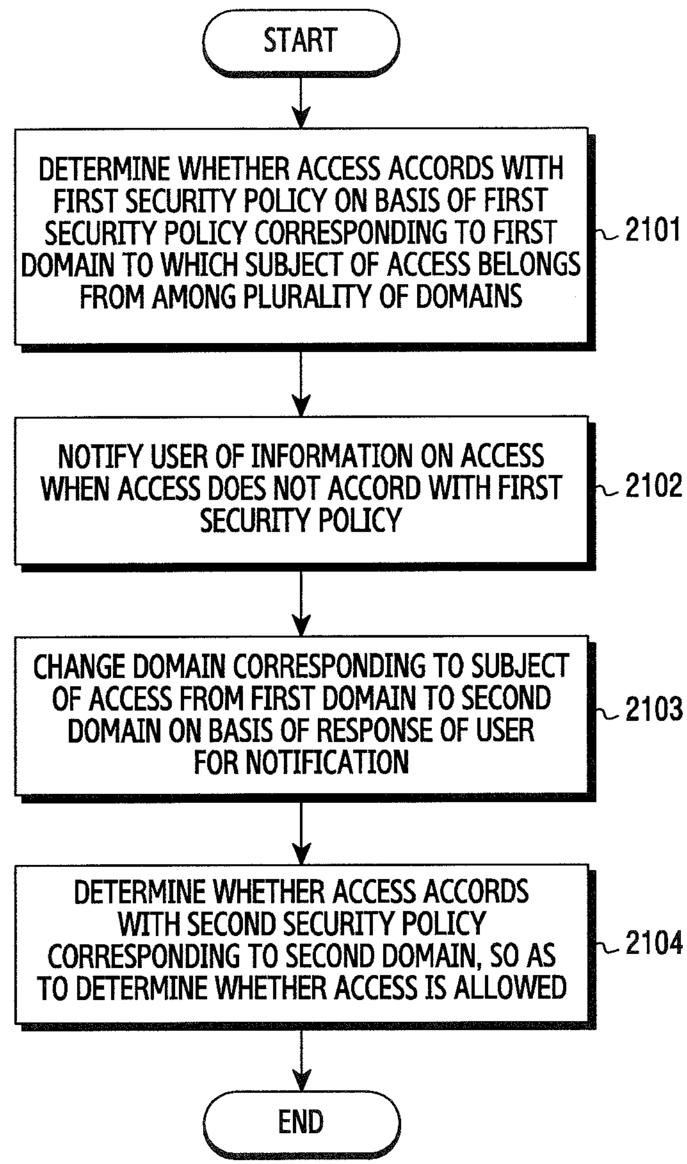
FIG. 21 is a flowchart illustrating a method of an electronic device, in which a location of a specific subject is changed according to various embodiments of the present disclosure.

FIG. 21 is a flowchart illustrating a method of an electronic device, in which a location of a specific subject is changed according to various embodiments of the present disclosure. First, referring to FIG. 21, the electronic device can determine whether an access accords with a first security policy on the basis of a first security policy corresponding to a first domain to which a subject of an access belongs from among a plurality of domains, in operation 2101.

The electronic device can notify a user of information on the access, when the access does not accord with the first security policy, in operation 2102.

The electronic device can change a domain corresponding to the subject of the access from the first domain to the second domain on the basis of a user's response to the notification, in operation 2103.

The electronic device can determine whether an access accords with a second security policy corresponding to the second domain, so as to determine whether the access is allowed, in operation 2104.

Various embodiments of the present disclosure proposes an apparatus and method which can propose an effective response manual in occurrence of a denial, thereby improving convenience of a user while not damaging security.

What is claimed is:

1. A method of operating an electronic device, the method comprising:

recognizing, by a processor of the electronic device, a policy violation occurring due to an attempted access by an application program which does not match a security policy;

denying the attempted access based on the security policy;

transmitting information on the recognizing of the policy violation to a server;

receiving information related to a security level of the electronic device from the server;

displaying a message indicating a subject of the policy violation and a set of specified objects related to the policy violation, based on the security level of the electronic device, and the information related to the security level of the electronic device on a display of the electronic device;

changing, by the processor, the security level based on a user input corresponding to the displayed information; and recording, as an access refusal log, by the processor, information on the policy violation including information of the application program or information of an object of the attempted access, when the attempted access of the application program corresponding to the policy violation is not permitted, wherein the transmitting of the information on the policy violation to the server is based on at least one of upload period information requested from the server, preconfigured upload period information, or a user's input.

2. The method of claim 1, wherein the object comprises at least one of a system resource, a file, or a device.

3. The method of claim 1, wherein the recording comprises recording the access refusal log in one of a plurality of log files based on at least a part of the information on the policy violation.

4. The method of claim 1, wherein the displaying of the message comprises providing a selection menu for receiving an input of a user's selection for at least one function through a user interface.

5. The method of claim 1, further comprising identifying the subject of the policy violation according to the application program.

6. An electronic device comprising:

a memory;

a display;

a communication module; and a processor configured to:

recognize a policy violation occurring due to an attempted access by an application program which does not match a security policy, deny the attempted access based on the security policy, transmit information on the recognizing of the policy violation to a server, receive information related to a security level of the electronic device from the server, control the display to display a message indicating a subject of the policy violation and a set of specified objects related to the policy violation, based on the security level of the electronic device, and the information related to the security level of the electronic device, change the security level based on a user input corresponding to the displayed information, record, as an access refusal log, information on the policy violation including information of the application program or information of an object of the attempted access, when the attempted access of the application program corresponding to the policy violation is not permitted, and control the communication module to transmit the information on the policy violation to the server based on at least one of upload period information requested from the server, predetermined upload period information, or a user's input.

7. The electronic device of claim 6, wherein the object comprises at least one of a system resource, a file, or a device.

8. The electronic device of claim 6, wherein the processor is configured to record the access refusal log in one of a plurality of log files based on at least a part of information on the policy violation.

9. The electronic device of claim 6, wherein the display is further configured to display a selection menu for receiving an input of a user's selection for at least one function through a user interface.

* * * * *